US010250348B2

(12) United States Patent
Yamada et al.

(10) Patent No.: US 10,250,348 B2
(45) Date of Patent: Apr. 2, 2019

(54) OPTICAL TRANSPORT SYSTEM AND RESOURCE OPTIMIZATION METHOD

(71) Applicant: NIPPON TELEGRAPH AND TELEPHONE CORPORATION, Tokyo (JP)

(72) Inventors: Yoshiaki Yamada, Yokosuka (JP); Kengo Shintaku, Yokosuka (JP); Takuya Ohara, Yokosuka (JP); Kei Kitamura, Tokyo (JP); Takashi Kotanigawa, Tokyo (JP); Takafumi Hamano, Tokyo (JP); Kaoru Arai, Tokyo (JP); Masahiro Yokota, Tokyo (JP); Hideki Maeda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 10 days.

(21) Appl. No.: 15/526,927

(22) PCT Filed: Nov. 26, 2015

(86) PCT No.: PCT/JP2015/083224
§ 371 (c)(1),
(2) Date: May 15, 2017

(87) PCT Pub. No.: WO2016/084893
PCT Pub. Date: Jun. 2, 2016

(65) Prior Publication Data
US 2017/0324496 A1    Nov. 9, 2017

(30) Foreign Application Priority Data
Nov. 28, 2014    (JP) ................................. 2014-241495

(51) Int. Cl.
*H04J 3/06* (2006.01)
*H04J 14/02* (2006.01)
(Continued)

(52) U.S. Cl.
CPC .......... *H04J 3/0652* (2013.01); *H04J 3/0623* (2013.01); *H04J 3/1652* (2013.01); *H04J 14/00* (2013.01);
(Continued)

(58) Field of Classification Search
CPC .. H04J 14/00; H04J 14/02; H04J 14/08; H04J 3/0652; H04J 3/1652; H04J 3/0623; H04J 2203/006; H04J 3/07
See application file for complete search history.

(56) References Cited

U.S. PATENT DOCUMENTS

2006/0115271 A1    6/2006  Hwang et al.
2012/0170936 A1*   7/2012  Vissers ................. H04J 3/1658
                                                   398/58
(Continued)

FOREIGN PATENT DOCUMENTS

CN      103533464 A    1/2014
EP      3038376 A1     6/2016
(Continued)

OTHER PUBLICATIONS

"Interfaces for the optical transport network", ITU-T G.709/Y.1331, Feb. 2012.
(Continued)

*Primary Examiner* — Mina M Shalaby
(74) *Attorney, Agent, or Firm* — Harness, Dickey & Pierce, P.L.C.

(57) ABSTRACT

In the optical transport system a transport frame generator divides a transport frame accommodating plural client signals into plural transmission signals. Subcarrier transmission
(Continued)

units convert the signals into optical signals using different optical carriers and transmit the converted optical signals. Subcarrier reception units receive the transmitted optical signals and convert the optical signals into reception signals. A transport frame termination unit combines the reception signals to restore the transport frame. A time-demultiplexing processor time-demultiplexes the restored transport frame to be separated into the client signals. A time slot control unit determines a new time slot allocation when time-multiplexing the client signals in the transport frame and stops supply of electric power to a subcarrier transmission unit and a subcarrier reception unit that transmit and receive an optical signal to which the client signals are not allocated.

14 Claims, 30 Drawing Sheets

(51) Int. Cl.
| | | |
|---|---|---|
| *H04J 14/08* | (2006.01) | |
| *H04J 3/16* | (2006.01) | |
| *H04J 14/00* | (2006.01) | |
| *H04J 3/07* | (2006.01) | |

(52) U.S. Cl.
CPC ............... *H04J 14/02* (2013.01); *H04J 14/08* (2013.01); *H04J 3/07* (2013.01); *H04J 2203/006* (2013.01)

(56) References Cited

U.S. PATENT DOCUMENTS

| | | |
|---|---|---|
| 2014/0226981 A1 | 8/2014 | Kuwabara |
| 2014/0270780 A1 | 9/2014 | Calderon et al. |

FOREIGN PATENT DOCUMENTS

| | | | |
|---|---|---|---|
| JP | 2006-157847 A | 6/2006 | |
| JP | 2012-119999 A | 6/2012 | |
| JP | 2013-005448 A | 1/2013 | |
| JP | 2014-007487 A | 1/2014 | |
| JP | 2014-158069 A | 8/2014 | |
| WO | WO-2014/166077 A1 | 10/2014 | |

OTHER PUBLICATIONS

T. Ohara, "OTN Interface Technologies and Standardization Trend", IEICE 2014, Mar. 2014, BI-5-1, SS-47 to SS-48, with partial translation thereof.

N. Yoshikane et al., "Trend of Beyond 100G OTN Interface Standardization", Proceedings of the Communications Society Conference of IEICE 1, 2014, Sep. 2014, pp. SSS-8 to SSS-9, TK-1-4.

K. Sone et al., "Demonstration of Hitless Spectrum Defragmentation using Real-time Coherent Receivers in Flexible Grid Optical Networks", IEICE Technical Report, Jan. 2013, vol. 112, No. 395, pp. 31-36, OCS2012-90.

International Search Report for PCT/JP2015/083224, ISA/JP, Tokyo, dated Jan. 12, 2016, with English translation thereof.

Japanese Office Action in the parallel application JP 2016-561940, dated Feb. 13, 2018, with English translation attached.

Masahiko Jinno: "Spectrum-Efficient and Scalable Elastic Optical Path Network: Architecture, Benefits, and Enabling Technologies", Nov. 1 2009 (Nov. 1 2009), XP055276995, DOI: 10.1109/MCOM.2009.5307468.

Chen Xiaomin et al: "Optimized Parallel Transmission in Elastic Optical Networks to Support High-Speed Ethernet", Journal of Lightwave Technology, IEEE Service Center, New York, NY, US, vol. 32, No. 2, Jan. 15, 2014 (Jan. 15, 2014), pp. 228-238, XP011533538, ISSN: 0733-8724, DOI: 10.1109/JLT.2013.2291318.

Tomkos Ioannis et al: "A Tutorial on the Flexible Optical Networking Paradigm: State of the Art, Trends, and Research Challenges", Proceedings of the IEEE, IEEE. New York, US, vol. 102, No. 9, Sep. 1, 2014 (Sep. 1, 2014), pp. 1317-1337, XP011556820, ISSN: 0018-9219, DOI: 10.1109/JPROC.2014.2324652.

Extended European Search Report in parallel application EP 15863525.0, ISA/EP, Munich, dated May 23, 2018.

Chinese Office Action in parallel application CN201580064165.8, SIPO, dated May 3, 2018, with partial translation of Search Report.

Notice of Allowance in parallel application JP 2016-561940, JPO, dated Sep. 4 25, 2018, with English translation attached.

\* cited by examiner

| TIME SLOT | UTILIZATION SITUATION |
|---|---|
| SC#1-TS#1 | Client Signal #1 |
| SC#1-TS#2 | Client Signal #1 |
| SC#1-TS#3 | Client Signal #1 |
| SC#1-TS#4 | Client Signal #1 |
| SC#1-TS#5 | Client Signal #1 |
| SC#1-TS#6 | EMPTY |
| SC#1-TS#7 | EMPTY |
| SC#1-TS#8 | EMPTY |
| SC#1-TS#9 | EMPTY |
| SC#1-TS#10 | EMPTY |
| SC#2-TS#1 | EMPTY |
| SC#2-TS#2 | EMPTY |
| SC#2-TS#3 | EMPTY |
| SC#2-TS#4 | EMPTY |
| SC#2-TS#5 | EMPTY |
| SC#2-TS#6 | Client Signal #3 |
| SC#2-TS#7 | Client Signal #3 |
| SC#2-TS#8 | Client Signal #3 |
| SC#2-TS#9 | Client Signal #3 |
| SC#2-TS#10 | Client Signal #3 |

FIG. 12B

| TIME SLOT | UTILIZATION SITUATION |
|---|---|
| SC#3-TS#1 | EMPTY |
| SC#3-TS#2 | EMPTY |
| SC#3-TS#3 | EMPTY |
| SC#3-TS#4 | EMPTY |
| SC#3-TS#5 | EMPTY |
| SC#3-TS#6 | Client Signal #3 |
| SC#3-TS#7 | Client Signal #3 |
| SC#3-TS#8 | Client Signal #3 |
| SC#3-TS#9 | Client Signal #3 |
| SC#3-TS#10 | Client Signal #3 |
| SC#4-TS#1 | EMPTY |
| SC#4-TS#2 | Client Signal #4 |
| SC#4-TS#3 | Client Signal #4 |
| SC#4-TS#4 | Client Signal #4 |
| SC#4-TS#5 | Client Signal #4 |
| SC#4-TS#6 | EMPTY |
| SC#4-TS#7 | EMPTY |
| SC#4-TS#8 | EMPTY |
| SC#4-TS#9 | Client Signal #2 |
| SC#4-TS#10 | EMPTY |

FIG. 13A

| TIME SLOT | UTILIZATION SITUATION |
|---|---|
| SC#1-TS#1 | Client Signal #1 |
| SC#1-TS#2 | Client Signal #1 |
| SC#1-TS#3 | Client Signal #1 |
| SC#1-TS#4 | Client Signal #1 |
| SC#1-TS#5 | Client Signal #1 |
| SC#1-TS#6 | Client Signal #2 |
| SC#1-TS#7 | Client Signal #4 |
| SC#1-TS#8 | Client Signal #4 |
| SC#1-TS#9 | Client Signal #4 |
| SC#1-TS#10 | Client Signal #4 |
| SC#2-TS#1 | Client Signal #3 |
| SC#2-TS#2 | Client Signal #3 |
| SC#2-TS#3 | Client Signal #3 |
| SC#2-TS#4 | Client Signal #3 |
| SC#2-TS#5 | Client Signal #3 |
| SC#2-TS#6 | Client Signal #3 |
| SC#2-TS#7 | Client Signal #3 |
| SC#2-TS#8 | Client Signal #3 |
| SC#2-TS#9 | Client Signal #3 |
| SC#2-TS#10 | Client Signal #3 |

FIG. 13B

| TIME SLOT | UTILIZATION SITUATION |
|---|---|
| SC#3-TS#1 | EMPTY |
| SC#3-TS#2 | EMPTY |
| SC#3-TS#3 | EMPTY |
| SC#3-TS#4 | EMPTY |
| SC#3-TS#5 | EMPTY |
| SC#3-TS#6 | EMPTY |
| SC#3-TS#7 | EMPTY |
| SC#3-TS#8 | EMPTY |
| SC#3-TS#9 | EMPTY |
| SC#3-TS#10 | EMPTY |
| SC#4-TS#1 | EMPTY |
| SC#4-TS#2 | EMPTY |
| SC#4-TS#3 | EMPTY |
| SC#4-TS#4 | EMPTY |
| SC#4-TS#5 | EMPTY |
| SC#4-TS#6 | EMPTY |
| SC#4-TS#7 | EMPTY |
| SC#4-TS#8 | EMPTY |
| SC#4-TS#9 | EMPTY |
| SC#4-TS#10 | EMPTY |

FIG. 15A

| TIME SLOT SUBCARRIER—OTLC—TS# | USABLE/UNUSABLE | UTILIZATION SITUATION |
|---|---|---|
| SC#1-OTLC#1-TS#1 | USABLE | Client Signal #1 |
| SC#1-OTLC#1-TS#2 | USABLE | Client Signal #1 |
| SC#1-OTLC#1-TS#3 | USABLE | Client Signal #1 |
| SC#1-OTLC#1-TS#4 | USABLE | Client Signal #1 |
| SC#1-OTLC#1-TS#5 | USABLE | Client Signal #1 |
| SC#1-OTLC#1-TS#6 | USABLE | Client Signal #1 |
| SC#1-OTLC#1-TS#7 | USABLE | Client Signal #1 |
| SC#1-OTLC#1-TS#8 | USABLE | Client Signal #1 |
| SC#1-OTLC#1-TS#9 | USABLE | Client Signal #1 |
| SC#1-OTLC#1-TS#10 | USABLE | Client Signal #1 |
| SC#1-OTLC#1-TS#11 | USABLE | Client Signal #1 |
| SC#1-OTLC#1-TS#12 | USABLE | Client Signal #1 |
| SC#1-OTLC#1-TS#13 | USABLE | EMPTY |
| SC#1-OTLC#1-TS#14 | USABLE | EMPTY |
| SC#1-OTLC#1-TS#15 | USABLE | EMPTY |
| SC#1-OTLC#1-TS#16 | USABLE | EMPTY |
| SC#1-OTLC#1-TS#17 | USABLE | EMPTY |
| SC#1-OTLC#1-TS#18 | USABLE | EMPTY |
| SC#1-OTLC#1-TS#19 | USABLE | EMPTY |
| SC#1-OTLC#1-TS#20 | USABLE | EMPTY |

FIG. 15B

| TIME SLOT SUBCARRIER—OTLC—TS# | USABLE/UNUSABLE | UTILIZATION SITUATION |
|---|---|---|
| SC#1-OTLC#2-TS#1 | USABLE | EMPTY |
| SC#1-OTLC#2-TS#2 | USABLE | EMPTY |
| SC#1-OTLC#2-TS#3 | USABLE | EMPTY |
| SC#1-OTLC#2-TS#4 | USABLE | EMPTY |
| SC#1-OTLC#2-TS#5 | UNUSABLE | — |
| SC#1-OTLC#2-TS#6 | UNUSABLE | — |
| SC#1-OTLC#2-TS#7 | UNUSABLE | — |
| SC#1-OTLC#2-TS#8 | UNUSABLE | — |
| SC#1-OTLC#2-TS#9 | UNUSABLE | — |
| SC#1-OTLC#2-TS#10 | UNUSABLE | — |
| SC#1-OTLC#2-TS#11 | UNUSABLE | — |
| SC#1-OTLC#2-TS#12 | UNUSABLE | — |
| SC#1-OTLC#2-TS#13 | UNUSABLE | — |
| SC#1-OTLC#2-TS#14 | UNUSABLE | — |
| SC#1-OTLC#2-TS#15 | USABLE | EMPTY |
| SC#1-OTLC#2-TS#16 | USABLE | EMPTY |
| SC#1-OTLC#2-TS#17 | USABLE | EMPTY |
| SC#1-OTLC#2-TS#18 | USABLE | EMPTY |
| SC#1-OTLC#2-TS#19 | USABLE | EMPTY |
| SC#1-OTLC#2-TS#20 | USABLE | EMPTY |

FIG. 15C

| TIME SLOT SUBCARRIER—OTLC—TS# | USABLE/UNUSABLE | UTILIZATION SITUATION |
|---|---|---|
| SC#2-OTLC#3-TS#1 | USABLE | EMPTY |
| SC#2-OTLC#3-TS#2 | USABLE | EMPTY |
| SC#2-OTLC#3-TS#3 | USABLE | EMPTY |
| SC#2-OTLC#3-TS#4 | USABLE | EMPTY |
| SC#2-OTLC#3-TS#5 | USABLE | EMPTY |
| SC#2-OTLC#3-TS#6 | USABLE | EMPTY |
| SC#2-OTLC#3-TS#7 | USABLE | EMPTY |
| SC#2-OTLC#3-TS#8 | USABLE | EMPTY |
| SC#2-OTLC#3-TS#9 | USABLE | EMPTY |
| SC#2-OTLC#3-TS#10 | USABLE | EMPTY |
| SC#2-OTLC#3-TS#11 | USABLE | EMPTY |
| SC#2-OTLC#3-TS#12 | USABLE | EMPTY |
| SC#2-OTLC#3-TS#13 | USABLE | EMPTY |
| SC#2-OTLC#3-TS#14 | USABLE | EMPTY |
| SC#2-OTLC#3-TS#15 | USABLE | EMPTY |
| SC#2-OTLC#3-TS#16 | USABLE | EMPTY |
| SC#2-OTLC#3-TS#17 | USABLE | EMPTY |
| SC#2-OTLC#3-TS#18 | USABLE | EMPTY |
| SC#2-OTLC#3-TS#19 | USABLE | EMPTY |
| SC#2-OTLC#3-TS#20 | USABLE | EMPTY |

FIG. 15D

| TIME SLOT SUBCARRIER—OTLC—TS# | USABLE/UNUSABLE | UTILIZATION SITUATION |
|---|---|---|
| SC#2-OTLC#4-TS#1 | USABLE | Client Signal #3 |
| SC#2-OTLC#4-TS#2 | USABLE | Client Signal #3 |
| SC#2-OTLC#4-TS#3 | USABLE | Client Signal #3 |
| SC#2-OTLC#4-TS#4 | USABLE | Client Signal #3 |
| SC#2-OTLC#4-TS#5 | USABLE | Client Signal #3 |
| SC#2-OTLC#4-TS#6 | USABLE | Client Signal #3 |
| SC#2-OTLC#4-TS#7 | USABLE | Client Signal #3 |
| SC#2-OTLC#4-TS#8 | USABLE | Client Signal #3 |
| SC#2-OTLC#4-TS#9 | USABLE | Client Signal #3 |
| SC#2-OTLC#4-TS#10 | USABLE | Client Signal #3 |
| SC#2-OTLC#4-TS#11 | UNUSABLE | — |
| SC#2-OTLC#4-TS#12 | UNUSABLE | — |
| SC#2-OTLC#4-TS#13 | UNUSABLE | — |
| SC#2-OTLC#4-TS#14 | UNUSABLE | — |
| SC#2-OTLC#4-TS#15 | UNUSABLE | — |
| SC#2-OTLC#4-TS#16 | UNUSABLE | — |
| SC#2-OTLC#4-TS#17 | UNUSABLE | — |
| SC#2-OTLC#4-TS#18 | UNUSABLE | — |
| SC#2-OTLC#4-TS#19 | UNUSABLE | — |
| SC#2-OTLC#4-TS#20 | UNUSABLE | — |

FIG. 15E

| TIME SLOT SUBCARRIER-OTLC-TS# | USABLE/UNUSABLE | UTILIZATION SITUATION |
|---|---|---|
| SC#3-OTLC#5-TS#1 | USABLE | Client Signal #3 |
| SC#3-OTLC#5-TS#2 | USABLE | Client Signal #3 |
| SC#3-OTLC#5-TS#3 | USABLE | Client Signal #3 |
| SC#3-OTLC#5-TS#4 | USABLE | Client Signal #3 |
| SC#3-OTLC#5-TS#5 | USABLE | Client Signal #3 |
| SC#3-OTLC#5-TS#6 | USABLE | Client Signal #3 |
| SC#3-OTLC#5-TS#7 | USABLE | Client Signal #3 |
| SC#3-OTLC#5-TS#8 | USABLE | Client Signal #3 |
| SC#3-OTLC#5-TS#9 | USABLE | Client Signal #3 |
| SC#3-OTLC#5-TS#10 | USABLE | Client Signal #3 |
| SC#3-OTLC#5-TS#11 | USABLE | Client Signal #2 |
| SC#3-OTLC#5-TS#12 | USABLE | Client Signal #2 |
| SC#3-OTLC#5-TS#13 | USABLE | Client Signal #4 |
| SC#3-OTLC#5-TS#14 | USABLE | Client Signal #4 |
| SC#3-OTLC#5-TS#15 | USABLE | Client Signal #4 |
| SC#3-OTLC#5-TS#16 | USABLE | Client Signal #4 |
| SC#3-OTLC#5-TS#17 | USABLE | Client Signal #4 |
| SC#3-OTLC#5-TS#18 | USABLE | Client Signal #4 |
| SC#3-OTLC#5-TS#19 | USABLE | Client Signal #4 |
| SC#3-OTLC#5-TS#20 | USABLE | Client Signal #4 |

FIG. 15F

| TIME SLOT SUBCARRIER-OTLC-TS# | USABLE/UNUSABLE | UTILIZATION SITUATION |
|---|---|---|
| SC#3-OTLC#6-TS#1 | UNUSABLE | — |
| SC#3-OTLC#6-TS#2 | UNUSABLE | — |
| SC#3-OTLC#6-TS#3 | UNUSABLE | — |
| SC#3-OTLC#6-TS#4 | UNUSABLE | — |
| SC#3-OTLC#6-TS#5 | UNUSABLE | — |
| SC#3-OTLC#6-TS#6 | UNUSABLE | — |
| SC#3-OTLC#6-TS#7 | UNUSABLE | — |
| SC#3-OTLC#6-TS#8 | UNUSABLE | — |
| SC#3-OTLC#6-TS#9 | UNUSABLE | — |
| SC#3-OTLC#6-TS#10 | UNUSABLE | — |
| SC#3-OTLC#6-TS#11 | USABLE | Client Signal #2 |
| SC#3-OTLC#6-TS#12 | USABLE | Client Signal #2 |
| SC#3-OTLC#6-TS#13 | USABLE | Client Signal #4 |
| SC#3-OTLC#6-TS#14 | USABLE | Client Signal #4 |
| SC#3-OTLC#6-TS#15 | USABLE | Client Signal #4 |
| SC#3-OTLC#6-TS#16 | USABLE | Client Signal #4 |
| SC#3-OTLC#6-TS#17 | USABLE | Client Signal #4 |
| SC#3-OTLC#6-TS#18 | USABLE | Client Signal #4 |
| SC#3-OTLC#6-TS#19 | USABLE | Client Signal #4 |
| SC#3-OTLC#6-TS#20 | USABLE | Client Signal #4 |

FIG. 16A

| TIME SLOT SUBCARRIER-OTLC-TS# | USABLE/UNUSABLE | UTILIZATION SITUATION |
|---|---|---|
| SC#1-OTLC#1-TS#1 | USABLE | Client Signal #1 |
| SC#1-OTLC#1-TS#2 | USABLE | Client Signal #1 |
| SC#1-OTLC#1-TS#3 | USABLE | Client Signal #1 |
| SC#1-OTLC#1-TS#4 | USABLE | Client Signal #1 |
| SC#1-OTLC#1-TS#5 | USABLE | Client Signal #1 |
| SC#1-OTLC#1-TS#6 | USABLE | Client Signal #1 |
| SC#1-OTLC#1-TS#7 | USABLE | Client Signal #1 |
| SC#1-OTLC#1-TS#8 | USABLE | Client Signal #1 |
| SC#1-OTLC#1-TS#9 | USABLE | Client Signal #1 |
| SC#1-OTLC#1-TS#10 | USABLE | Client Signal #1 |
| SC#1-OTLC#1-TS#11 | USABLE | Client Signal #1 |
| SC#1-OTLC#1-TS#12 | USABLE | Client Signal #1 |
| SC#1-OTLC#1-TS#13 | USABLE | Client Signal #4 |
| SC#1-OTLC#1-TS#14 | USABLE | Client Signal #4 |
| SC#1-OTLC#1-TS#15 | USABLE | Client Signal #4 |
| SC#1-OTLC#1-TS#16 | USABLE | Client Signal #4 |
| SC#1-OTLC#1-TS#17 | USABLE | Client Signal #4 |
| SC#1-OTLC#1-TS#18 | USABLE | Client Signal #4 |
| SC#1-OTLC#1-TS#19 | USABLE | Client Signal #4 |
| SC#1-OTLC#1-TS#20 | USABLE | Client Signal #4 |

FIG. 16B

| TIME SLOT SUBCARRIER-OTLC-TS# | USABLE/UNUSABLE | UTILIZATION SITUATION |
|---|---|---|
| SC#1-OTLC#2-TS#1 | USABLE | Client Signal #2 |
| SC#1-OTLC#2-TS#2 | USABLE | Client Signal #2 |
| SC#1-OTLC#2-TS#3 | UNUSABLE | — |
| SC#1-OTLC#2-TS#4 | UNUSABLE | — |
| SC#1-OTLC#2-TS#5 | UNUSABLE | — |
| SC#1-OTLC#2-TS#6 | UNUSABLE | — |
| SC#1-OTLC#2-TS#7 | UNUSABLE | — |
| SC#1-OTLC#2-TS#8 | UNUSABLE | — |
| SC#1-OTLC#2-TS#9 | UNUSABLE | — |
| SC#1-OTLC#2-TS#10 | UNUSABLE | — |
| SC#1-OTLC#2-TS#11 | UNUSABLE | — |
| SC#1-OTLC#2-TS#12 | UNUSABLE | — |
| SC#1-OTLC#2-TS#13 | USABLE | Client Signal #4 |
| SC#1-OTLC#2-TS#14 | USABLE | Client Signal #4 |
| SC#1-OTLC#2-TS#15 | USABLE | Client Signal #4 |
| SC#1-OTLC#2-TS#16 | USABLE | Client Signal #4 |
| SC#1-OTLC#2-TS#17 | USABLE | Client Signal #4 |
| SC#1-OTLC#2-TS#18 | USABLE | Client Signal #4 |
| SC#1-OTLC#2-TS#19 | USABLE | Client Signal #4 |
| SC#1-OTLC#2-TS#20 | USABLE | Client Signal #4 |

FIG. 16C

| TIME SLOT SUBCARRIER-OTLC-TS# | USABLE/UNUSABLE | UTILIZATION SITUATION |
|---|---|---|
| SC#2-OTLC#3-TS#1 | USABLE | Client Signal #2 |
| SC#2-OTLC#3-TS#2 | USABLE | Client Signal #2 |
| SC#2-OTLC#3-TS#3 | USABLE | Client Signal #3 |
| SC#2-OTLC#3-TS#4 | USABLE | Client Signal #3 |
| SC#2-OTLC#3-TS#5 | USABLE | Client Signal #3 |
| SC#2-OTLC#3-TS#6 | USABLE | Client Signal #3 |
| SC#2-OTLC#3-TS#7 | USABLE | Client Signal #3 |
| SC#2-OTLC#3-TS#8 | USABLE | Client Signal #3 |
| SC#2-OTLC#3-TS#9 | USABLE | Client Signal #3 |
| SC#2-OTLC#3-TS#10 | USABLE | Client Signal #3 |
| SC#2-OTLC#3-TS#11 | USABLE | Client Signal #3 |
| SC#2-OTLC#3-TS#12 | USABLE | Client Signal #3 |
| SC#2-OTLC#3-TS#13 | USABLE | EMPTY |
| SC#2-OTLC#3-TS#14 | USABLE | EMPTY |
| SC#2-OTLC#3-TS#15 | USABLE | EMPTY |
| SC#2-OTLC#3-TS#16 | USABLE | EMPTY |
| SC#2-OTLC#3-TS#17 | USABLE | EMPTY |
| SC#2-OTLC#3-TS#18 | USABLE | EMPTY |
| SC#2-OTLC#3-TS#19 | USABLE | EMPTY |
| SC#2-OTLC#3-TS#20 | USABLE | EMPTY |

FIG. 16D

| TIME SLOT SUBCARRIER-OTLC-TS# | USABLE/UNUSABLE | UTILIZATION SITUATION |
|---|---|---|
| SC#2-OTLC#4-TS#1 | UNUSABLE | — |
| SC#2-OTLC#4-TS#2 | UNUSABLE | — |
| SC#2-OTLC#4-TS#3 | USABLE | Client Signal #3 |
| SC#2-OTLC#4-TS#4 | USABLE | Client Signal #3 |
| SC#2-OTLC#4-TS#5 | USABLE | Client Signal #3 |
| SC#2-OTLC#4-TS#6 | USABLE | Client Signal #3 |
| SC#2-OTLC#4-TS#7 | USABLE | Client Signal #3 |
| SC#2-OTLC#4-TS#8 | USABLE | Client Signal #3 |
| SC#2-OTLC#4-TS#9 | USABLE | Client Signal #3 |
| SC#2-OTLC#4-TS#10 | USABLE | Client Signal #3 |
| SC#2-OTLC#4-TS#11 | USABLE | Client Signal #3 |
| SC#2-OTLC#4-TS#12 | USABLE | Client Signal #3 |
| SC#2-OTLC#4-TS#13 | UNUSABLE | — |
| SC#2-OTLC#4-TS#14 | UNUSABLE | — |
| SC#2-OTLC#4-TS#15 | UNUSABLE | — |
| SC#2-OTLC#4-TS#16 | UNUSABLE | — |
| SC#2-OTLC#4-TS#17 | UNUSABLE | — |
| SC#2-OTLC#4-TS#18 | UNUSABLE | — |
| SC#2-OTLC#4-TS#19 | UNUSABLE | — |
| SC#2-OTLC#4-TS#20 | UNUSABLE | — |

FIG. 16E

| TIME SLOT SUBCARRIER-OTLC-TS# | USABLE/UNUSABLE | UTILIZATION SITUATION |
|---|---|---|
| SC#3-OTLC#5-TS#1 | USABLE | EMPTY |
| SC#3-OTLC#5-TS#2 | USABLE | EMPTY |
| SC#3-OTLC#5-TS#3 | USABLE | EMPTY |
| SC#3-OTLC#5-TS#4 | USABLE | EMPTY |
| SC#3-OTLC#5-TS#5 | USABLE | EMPTY |
| SC#3-OTLC#5-TS#6 | USABLE | EMPTY |
| SC#3-OTLC#5-TS#7 | USABLE | EMPTY |
| SC#3-OTLC#5-TS#8 | USABLE | EMPTY |
| SC#3-OTLC#5-TS#9 | USABLE | EMPTY |
| SC#3-OTLC#5-TS#10 | USABLE | EMPTY |
| SC#3-OTLC#5-TS#11 | USABLE | EMPTY |
| SC#3-OTLC#5-TS#12 | USABLE | EMPTY |
| SC#3-OTLC#5-TS#13 | USABLE | EMPTY |
| SC#3-OTLC#5-TS#14 | USABLE | EMPTY |
| SC#3-OTLC#5-TS#15 | USABLE | EMPTY |
| SC#3-OTLC#5-TS#16 | USABLE | EMPTY |
| SC#3-OTLC#5-TS#17 | USABLE | EMPTY |
| SC#3-OTLC#5-TS#18 | USABLE | EMPTY |
| SC#3-OTLC#5-TS#19 | USABLE | EMPTY |
| SC#3-OTLC#5-TS#20 | USABLE | EMPTY |

FIG. 16F

| TIME SLOT SUBCARRIER-OTLC-TS# | USABLE/UNUSABLE | UTILIZATION SITUATION |
|---|---|---|
| SC#3-OTLC#6-TS#1 | UNUSABLE | — |
| SC#3-OTLC#6-TS#2 | UNUSABLE | — |
| SC#3-OTLC#6-TS#3 | UNUSABLE | — |
| SC#3-OTLC#6-TS#4 | UNUSABLE | — |
| SC#3-OTLC#6-TS#5 | UNUSABLE | — |
| SC#3-OTLC#6-TS#6 | UNUSABLE | — |
| SC#3-OTLC#6-TS#7 | UNUSABLE | — |
| SC#3-OTLC#6-TS#8 | UNUSABLE | — |
| SC#3-OTLC#6-TS#9 | UNUSABLE | — |
| SC#3-OTLC#6-TS#10 | UNUSABLE | — |
| SC#3-OTLC#6-TS#11 | USABLE | EMPTY |
| SC#3-OTLC#6-TS#12 | USABLE | EMPTY |
| SC#3-OTLC#6-TS#13 | USABLE | EMPTY |
| SC#3-OTLC#6-TS#14 | USABLE | EMPTY |
| SC#3-OTLC#6-TS#15 | USABLE | EMPTY |
| SC#3-OTLC#6-TS#16 | USABLE | EMPTY |
| SC#3-OTLC#6-TS#17 | USABLE | EMPTY |
| SC#3-OTLC#6-TS#18 | USABLE | EMPTY |
| SC#3-OTLC#6-TS#19 | USABLE | EMPTY |
| SC#3-OTLC#6-TS#20 | USABLE | EMPTY |

FIG. 17A

| | 1 | 2 | 3 | 4 | 5 | 6 | 7 | 8 | 1.25GTS |
|---|---|---|---|---|---|---|---|---|---|
| PSI[2] | TS occupied | Tributary Port # | | | | | | | TS1 |
| PSI[3] | TS occupied | Tributary Port # | | | | | | | TS2 |
| PSI[4] | TS occupied | Tributary Port # | | | | | | | TS3 |
| PSI[5] | TS occupied | Tributary Port # | | | | | | | TS4 |
| PSI[6] | TS occupied | Tributary Port # | | | | | | | TS5 |
| PSI[7] | TS occupied | Tributary Port # | | | | | | | TS6 |
| PSI[8] | TS occupied | Tributary Port # | | | | | | | TS7 |
| PSI[9] | TS occupied | Tributary Port # | | | | | | | TS8 |
| : | : | : | | | | | | | : |
| PSI[81] | TS occupied | Tributary Port # | | | | | | | TS80 |

FIG. 17B

| | 1 | 2 | 3 | 4 | 5 | 6 | 7 | 8 | |
|---|---|---|---|---|---|---|---|---|---|
| PSI[1+i] | Occupation | Tributary Port # | | | | | | | TS #i |

0:Unallocated
1:Allocated 000 0000:Tributary Port1
000 0001:Tributary Port2
000 0010:Tributary Port3
000 0011:Tributary Port4
:
100 1111:Tributary Port80

FIG. 19

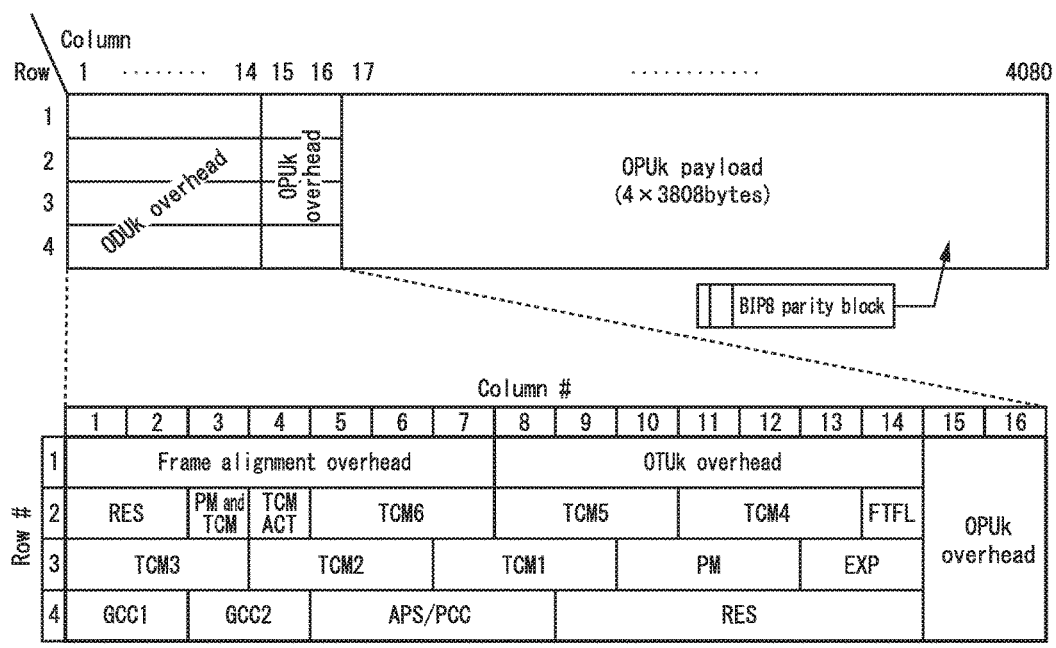

| | |
|---|---|
| PM | Path monitoring |
| TCM | Tandem connection monitoring |
| PM and TCM | Path monitoring and Tandem connection monitoring |
| SAPI | Source access point identifier |
| DAPI | Destination access point identifier |
| RES | Reserved for future international standardization |
| ACT | Activation /deactivation control channel |
| FTFL | Fault type and fault location reporting channel |
| EXP | Experimental |
| GCC | General communication channel |
| APS | Automatic protection switching coordination channel |
| PCC | Protecion communication control channel |
| BIAE | Backward incoming alignment error |
| TTI | Trail trace identifier |
| BIP8 | Bit interleaved parity-level 8 |
| BEI | Backward error indication |
| BDI | Backward defect indication |
| STAT | Status |
| PSI | Payload structure identifier |
| PT | Payload type |
| DM | Delay measurement |

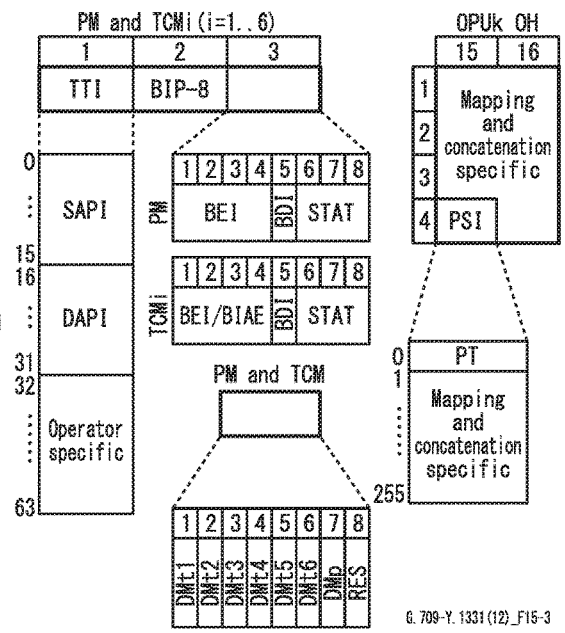

G. 709-Y. 1331 (12)_F15-3

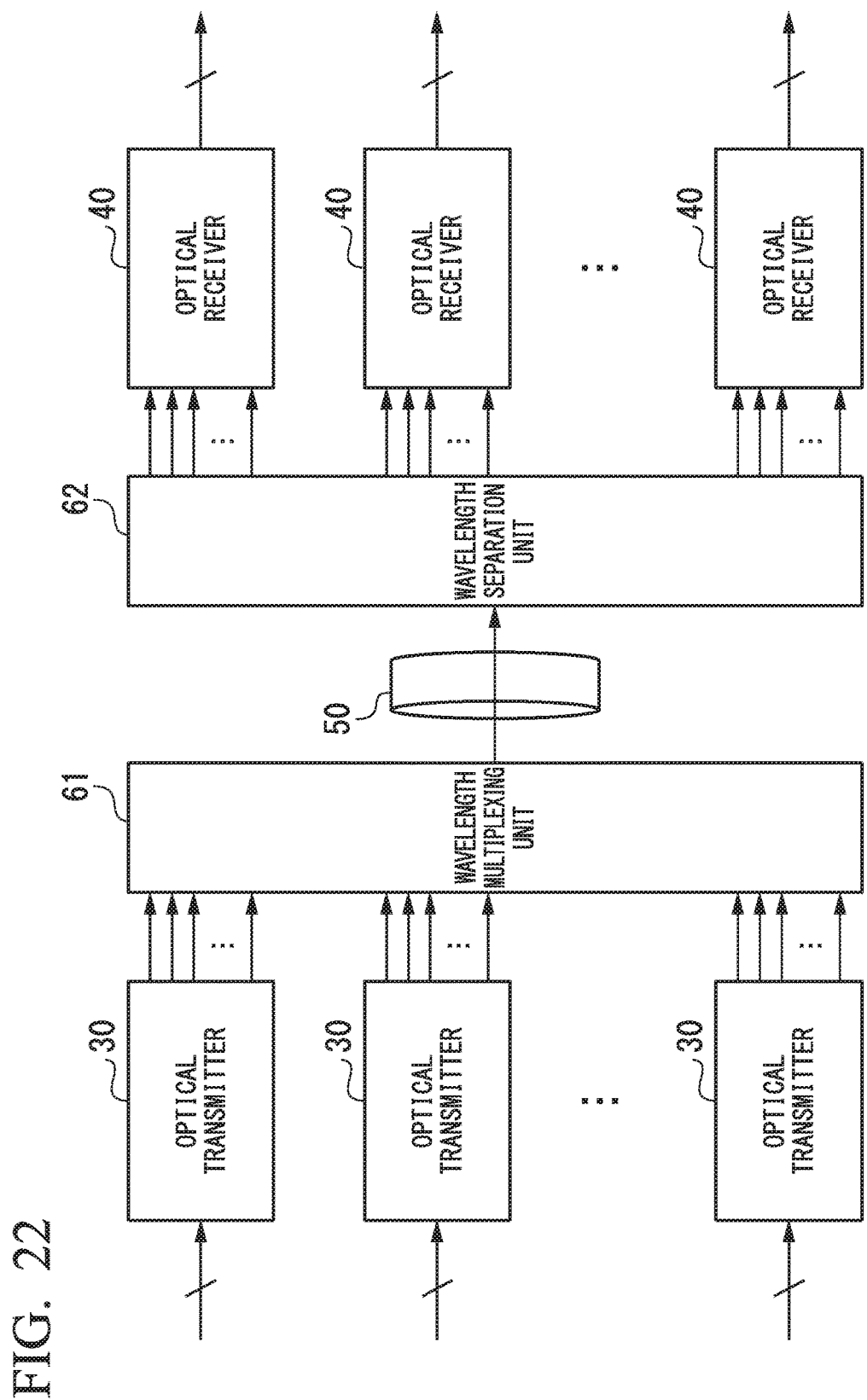

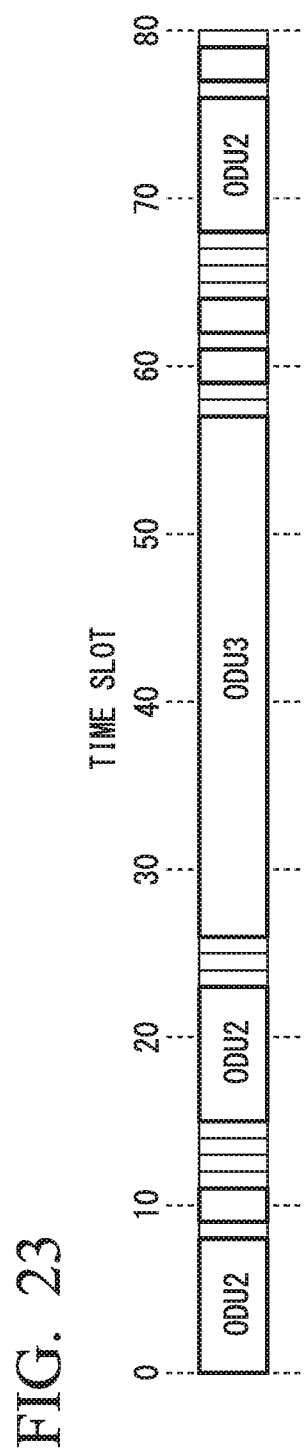

OPTICAL TRANSPORT SYSTEM AND RESOURCE OPTIMIZATION METHOD

CROSS-REFERENCE TO RELATED APPLICATIONS

This application is a 371 U.S. National Stage of International Application No. PCT/JP2015083224, filed on Nov. 26, 2015, which claims the benefit of and priority to Japanese Patent Application No. 2014-241495, filed on Nov. 28, 2014. The disclosures of both of the above applications are incorporated herein by reference.

TECHNICAL FIELD

The present invention relates to an optical transport system and a resource optimization method.

BACKGROUND ART

In an optical transport network (OTN), which is a large-capacity wide area photonic network, various client signals in a synchronous digital hierarchy (SDH), the Ethernet (registered trademark), and the like are accommodated and transferred. In recent years, increase in traffic of client signals is remarkable, and accordingly, standardization of the OTN has been advanced so as to cope with increase in speed (e.g., see Non-Patent Document 1). Currently, an OTUCn (Cn represents 100 G×n), which is an OTN technique over 100 G (B100 G, in which G represents gigabits per second), is being studied (e.g., see Non-Patent Document 2). In the OTUCn, a transport capacity of one optical channel is broader than that of a conventional optical channel transport unit (OTU). However, because of an operational speed of an electronic circuit used for a transceiver of an optical signal, it is difficult to enlarge single carrier transport in a band of one optical channel as before to achieve a larger capacity. For this reason, in the OTUCn, a technique for realizing a larger capacity by multicarrier transport using a plurality of optical subcarriers in a band of one optical channel is being studied.

PRIOR ART DOCUMENTS

Non-Patent Documents

Non-Patent Document 1: "Interfaces for the optical transport network", ITU-T G.709/Y. 1331, February 2012
Non-Patent Document 2: Takuya Ohara, "OTN interface Technologies and Standardization Trend", 2014, The Institute of Electronics, Information and Communication Engineers, General Conference, Communications lecture paper 2, BI-5-1, SS-47-SS-48, March 2014

SUMMARY OF INVENTION

Problems to be Solved by the Invention

In an optical transport apparatus using single carrier transport, in order to time-multiplex a plurality of client signals, the client signals are allocated in the unit of time slots (which may be referred to as tributary slots) defined in a frame structure in the SDH, the OTN, or the like. If the allocation and deallocation of the client signals with respect to the time slots are repeated in accordance with opening and deletion of electric paths, fragmentation (time slot fragmentation) occurs in the allocation of the time slots. FIG. 23 is a diagram showing an example of fragmentation. The allocation shown in FIG. 23 shows a case in which all client signals use consecutive time slots, but client signals may be allocated to inconsecutive time slots.

On the other hand, in the above-described multicarrier transport, if opening and deletion of electric paths are repeated and fragmentation occurs in the allocation of time slots, the number of subcarriers used for the multicarrier transport becomes excessive with respect to traffic of transported client signals, which leads to a waste of resources.

In view of the above circumstances, an object of the present invention is to provide an optical transport system and a resource optimization method for enhancing the utilization efficiency of resources in multicarrier transport using time multiplexing.

Means for Solving the Problems

An aspect of the present invention is an optical transport system including: a time-multiplexing processing unit that time-multiplexes a plurality of client signals and accommodates the client signals in any of a plurality of time slots included in one transport frame; a time slot control unit that determines, when the time-multiplexing processing unit time-multiplexes the plurality of client signals, which of the plurality of time slots each of the client signals is to be accommodated in; a transport frame generation unit that divides the transport frame in which the plurality of client signals are accommodated into a plurality of transmission signals; a plurality of subcarrier transmission units that are provided for the transmission signals and convert the plurality of transmission signals which are electric signals into optical signals using different optical carriers, and transmit the converted optical signals; a plurality of subcarrier reception units that are provided corresponding to the plurality of subcarrier transmission units and receive the optical signals transmitted from the corresponding subcarrier transmission units, and convert the optical signals into reception signals; a transport frame termination unit that combines the reception signals converted by the plurality of subcarrier reception units to restore the transport frame; a time-demultiplexing processing unit that time-demultiplexes the transport frame restored by the transport frame termination unit to be separated into the plurality of client signals; and a power source control unit that controls supply of electric power to the plurality of subcarrier transmission units and the plurality of subcarrier reception units, wherein the time slot control unit determines a new allocation that accommodates the plurality of client signals sequentially from a time slot corresponding to any one of a plurality of subcarriers without proving an empty time slot, notifies the time-multiplexing processing unit and the time-demultiplexing processing unit of the new allocation, and causes the power source control unit to stop the supply of electric power to a subcarrier transmission unit and a subcarrier reception unit that transmit and receive an optical signal to which the client signals are not allocated.

Preferably, in the above-described optical transport system, the plurality of time slots include an unusable time slot in which the client signals are not accommodated, and the time slot control unit determines the new allocation so that the plurality of client signals are accommodated in time slots excluding the unusable time slot.

Preferably, in the above-described optical transport system, in an allocation of the client signals, the time slot control unit determines whether fragmentation of the time slots occurs in the plurality of time slots in the transport frame, and determines the new allocation if it is determined that the fragmentation of the time slots occurs.

Preferably, in the above-described optical transport system, the new allocation is transported to the time-demultiplexing processing unit using an overhead of the transport frame.

Preferably, the above-described optical transport system further includes a control signal transport unit that transports the new allocation determined by the time slot control unit to the time-demultiplexing processing unit.

Preferably, in the above-described optical transport system, the time slot control unit transports the new allocation to the time-demultiplexing processing unit a plurality of times, and if the same new allocation is received a predetermined number of times, the time-demultiplexing processing unit time-de-multiplexes the transport frame restored by the transport frame termination unit on the basis of the allocation to be separated into the plurality of client signals.

Preferably, in the above-described optical transport system, when determining the new allocation, the time slot control unit accommodates the client signals sequentially from a time slot corresponding to, among a plurality of sets of the subcarrier transmission units and the subcarrier reception units, a set that is transmitting and receiving a control signal common to all the sets.

Further, an aspect of the present invention is a resource optimization method including: a time-multiplexing processing step of time-multiplexing a plurality of client signals and accommodating the client signals in any of a plurality of time slots included in one transport frame, in a time-multiplexing processing unit; a time slot control step of determining, when the plurality of client signals are time-multiplexed in the time-multiplexing processing step, which of the plurality of time slots each of the client signals is to be accommodated in; a transport frame generation step of dividing the transport frame in which the plurality of client signals are accommodated into a plurality of transmission signals; a subcarrier transmission step of converting the plurality of transmission signals which are electric signals into optical signals using different optical carriers and transmitting the converted optical signals, in a plurality of subcarrier transmission units that are provided for the transmission signals; a subcarrier reception step of receiving, in a plurality of subcarrier reception units that are provided corresponding to the plurality of subcarrier transmission units, the optical signals transmitted from corresponding subcarrier transmission units and converting the optical signals into reception signals; a transport frame termination step of combining the reception signals converted in the subcarrier reception step to restore the transport frame;

a time-demultiplexing processing step of time-demultiplexing the transport frame restored in the transport frame termination step to be separated into the plurality of client signals, in a time-demultiplexing processing unit; and a power source control step of controlling supply of electric power to the plurality of subcarrier transmission units and the plurality of subcarrier reception units, wherein the time slot control step includes: a step of determining a new allocation that accommodates the plurality of client signals sequentially from a time slot corresponding to any one of a plurality of subcarriers without providing an empty time slot; a step of notifying the time-multiplexing processing unit and the time-demultiplexing processing unit of the new allocation; and a step of stopping the supply of electric power to a subcarrier transmission unit and a subcarrier reception unit that transmit and receive an optical signal to which the client signals are not allocated.

Advantageous Effects of Invention

According to the present invention, it is possible to enhance the utilization efficiency of resources by eliminating fragmentation that occurs in the allocation of time slots of a transport frame and by stopping power supply to a subcarrier transmission unit and a subcarrier reception unit that do not perform transmission and reception of client signals.

BRIEF DESCRIPTION OF DRAWINGS

FIG. 11 is a diagram showing an example of operation of an optical transmitter 30 and an optical receiver 40.

FIG. 12A is a diagram showing an example of a time slot utilization situation table provided in a TS control unit 35.

FIG. 12B is a diagram showing an example of a time slot utilization situation table provided in the TS control unit 35.

FIG. 13A is a diagram showing another example of a time slot utilization situation table provided in the TS control unit 35.

FIG. 13B is a diagram showing another example of a time slot utilization situation table provided in the TS control unit 35.

FIG. 15A is a diagram showing an example of a time slot utilization situation table provided in the TS control unit 35.

FIG. 15B is a diagram showing an example of a time slot utilization situation table provided in the TS control unit 35.

FIG. 15C is a diagram showing an example of a time slot utilization situation table provided in the TS control unit 35.

FIG. 15D is a diagram showing an example of a time slot utilization situation table provided in the TS control unit 35.

FIG. 15E is a diagram showing an example of a time slot utilization situation table provided in the TS control unit 35.

FIG. 15F is a diagram showing an example of a time slot utilization situation table provided in the TS control unit 35.

FIG. 16A is a diagram showing an example of a time slot utilization situation table provided in the TS control unit 35.

FIG. 16B is a diagram showing an example of a time slot utilization situation table provided in the TS control unit 35.

FIG. 16C is a diagram showing an example of a time slot utilization situation table provided in the TS control unit 35.

FIG. 16D is a diagram showing an example of a time slot utilization situation table provided in the TS control unit 35.

FIG. 16E is a diagram showing an example of a time slot utilization situation table provided in the TS control unit 35.

FIG. 16F is a diagram showing an example of a time slot utilization situation table provided in the TS control unit 35.

FIG. 17A is a diagram showing a time slot utilization situation table in OTN.

FIG. 17B is a diagram showing a time slot utilization situation table in OTN.

FIG. 19 is a diagram showing a frame structure of an ODUk.

FIG. 22 is a block diagram showing a configuration of an optical transport system according to a fourth embodiment.

FIG. 23 is a diagram showing an example of fragmentation.

MODES FOR CARRYING OUT THE INVENTION

Figure 1:
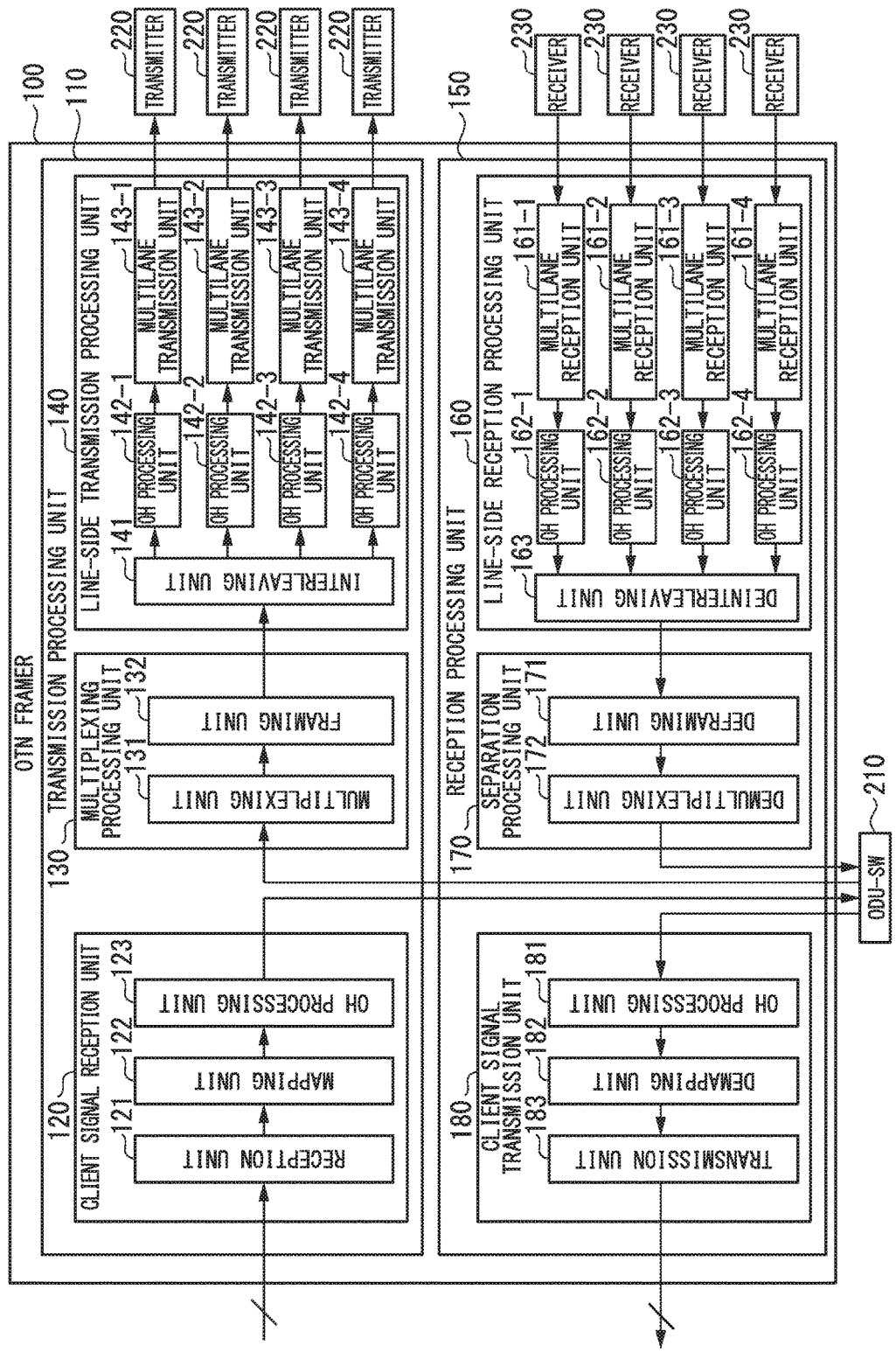
FIG. 1 is a functional block diagram of an OTN framer 100 to which the embodiments of the present invention can be applied.

Hereinafter, embodiments of the present invention will be described with reference to the drawings. FIG. 1 is a functional block diagram of an OTN framer 100 to which the embodiments of the present invention can be applied. The OTN framer 100 shown in the figure performs communication through an OTUCn (in which Cn represents 100×n, and n is an integer which is equal to or greater than 2), which is a standard of an OTN for performing transport over 100 G (B100 G, in which G represents gigabits per second). FIG. 1 shows an example of a case in which n is 4, that is, a case in which the OTN framer 100 performs communication through an OTUC4.

In an OTN transport technique, client signals of various communication schemes are accommodated and transferred through optical transport. In the OTN, a fixed frame structure is used, client signals are handled in the unit of TS (tributary slots, which is also referred to as time slots) of 1.25 G (i.e., on the basis of multiples thereof) by an ODU0 (ODU: Optical channel Data Unit), which is a minimum unit capable of accommodating Gigabit Ethernet (GbE (registered trademark)). The OTN provides the same path management, Operations, Administration, and Maintenance (OAM) function, and protection function as in the SDH.

The OTN framer 100 separates n×100 G signals of one optical channel in which a plurality of client signals are multiplexed to generate n 100 G parallel signals. The n parallel signals are multicarrier-transported through a plurality of optical subcarriers, but physically, one parallel signal may be transported through one optical subcarrier, or a plurality of parallel signals may be transported through one optical subcarrier. The multicarrier transport is a communication scheme for increasing the capacity of one channel by parallel transport of signals of one channel using a plurality of optical subcarriers. In the multicarrier transport, subcarriers are multiplexed for each destination (connection destination) at high density, and are electrically separated from each other. When one parallel signal is transported through one optical subcarrier, the band of the optical subcarrier is 100 G, and when two parallel signals are transported through one optical subcarrier, the band of the optical subcarrier is 200 G. For the optical transport, 4SC-DP-QPSK (4 SubCarrier-Dual Polarization-Quadrature Phase Shift Keying), 2SC-DP-16QAM (2 SubCarrier-Dual Polarization-Quadrature Amplitude Modulation), or the like is used.

As shown in FIG. 1, the OTN framer 100 includes a transmission processing unit 110 and a reception processing unit 150. The transmission processing unit 110 includes a client signal reception unit 120, a multiplexing processing unit 130, and a line-side transmission processing unit 140.

The client signal reception unit 120 includes a reception unit 121, a mapping unit 122, and an OH processing unit 123. The reception unit 121 receives a client signal. The mapping unit 122 maps one client signal received by the reception unit 121 into a payload of a lower order optical channel data unit (LO-ODU) frame. The OH processing unit 123 adds an overhead (OH) to the LO-ODU frame for which the mapping unit 122 sets the client signal. The OH processing unit 123 outputs an electric path signal of the LO-ODU frame to an ODU-switch (hereinafter referred to as "ODU-SW") 210. The ODU-SW 210 is also connected to another OTN framer 100, and performs path exchange of electric path signals.

The multiplexing processing unit 130 includes a multiplexing unit 131 and a framing unit 132. The multiplexing unit 131 sets an electric path signal received from the ODU-SW 210 in the LO-ODU frame. The multiplexing unit 131 maps the LO-ODU frame into an optical channel data tributary unit (ODTU) frame, and then time-multiplexes a plurality of ODTU frames to generate an ODUCn frame, which is an higher order ODU (HO-ODU). The framing unit 132 adds an OH and a forward error correction (FEC) to the ODUCn frame generated by the multiplexing unit 131 to generate an OTUCn frame. The framing unit 132 outputs a signal of the OTUCn frame to the line-side transmission processing unit 140.

The line-side transmission processing unit 140 includes an interleaving unit 141, OH processing units 142-1 to 142-n, and multilane transmission units 143-1 to 143-n.

The interleaving unit 141 receives OTUCn frame signals from the multiplexing processing unit 130 and byte-interleaves the received n×100 G OTUCn frame signals to generate n OTLCn.n frame signals. An OTLCn.n frame is a frame of a 100 G parallel signal. An i-th OTLCn.n frame is denoted as an OTLCn.n#i frame (i is an integer which is equal to or greater than 1 and is equal to or smaller than n). The interleaving unit 141 outputs the generated n OTLCn.n#i frames to the OH processing units 142-i, respectively.

The OH processing units 142-1 to 142-n set OHs in the OTLCn.n frames received from the interleaving unit 141. The OH processing units 142-i output the OTLCn.n#i frames in which the OHs are set to the multilane transmission units 143-i.

The multilane transmission units 143-1 to 143-n output parallel signals of the OTLCn.n frames received from the OH processing units 142-1 to 142-n to transmitters 220. For example, the multilane transmission units 143-i output the parallel signals of the OTLCn.n#i frames in parallel to the transmitters 220 using four 28 G electric interconnections. The transmitters 220 use optical subcarriers having different wavelengths. The transmitters 220 convert the received parallel signals from electric signals to optical signals and performs multicarrier transport. It should be noted that the plurality of multilane transmission units 143-i may be connected to one transmitter 220. When j (j is equal to or greater than 2 and is equal to or smaller than n) multilane transmission units 143-i are connected to one transmitter 220, the transmitter 220 transports j parallel signals through j×100 G optical subcarriers.

The reception processing unit 150 includes a line-side reception processing unit 160, a separation processing unit 170, and a client signal transmission unit 180.

The line-side reception processing unit 160 includes multilane reception units 161-1 to 161-n, OH processing units 162-1 to 162-n, and a deinterleaving unit 163.

The multilane reception units 161-1 to 161-n receive optical signals received by receivers 230 through multicarrier transport, as electric signals. The receivers 230 receive optical signals through optical subcarriers having different wavelengths, convert the received optical signals into electric signals, and output the result to the multilane reception units 161-1 to 161-n. The multilane reception units 161-i output electric signals, which are received in parallel from the receivers 230, for example, using four 28 G electric interconnections, to the OH processing units 162-i.

The OH processing units 162-1 to 162-n detect the heads of frames from the received signals on the basis of frame alignment signals (FAS) or multi frame alignment signals (MFAS) set in the OHs of the OTLCn.n frames. By detecting the head positions, the OH processing units 162-i compensate for a delay time difference, extract OTLCn.n#i frames from the received signals, and output the result to the deinterleaving unit 163.

The deinterleaving unit 163 deinterleaves the OTLCn.n#1 frame to the OTLCn.n#n frame respectively received from the OH processing units 162-1 to 162-n to generate a single OTUCn frame.

The separation processing unit 170 includes a deframing unit 171 and a demultiplexing unit 172. The deframing unit 171 FEC-decodes a signal of the OTUCn frame generated by the deinterleaving unit 163, extracts an ODUCn frame in which LO-ODU frames are time-multiplexed from the decoded OTUCn frame, and outputs the result to the demultiplexing unit 172. The demultiplexing unit 172 extracts an LO-ODU frame in which each client signal is set from a signal of the ODUCn frame extracted by the deframing unit 171, and outputs an electric path signal of the LO-ODU frame to the ODU-SW 210.

The client signal transmission unit 180 includes an OH processing unit 181, a demapping unit 182, and a transmission unit 183. The OH processing unit 181 receives an electric path signal from the ODU-SW 210, and decodes an LO-ODU frame from the received electric path signal. The OH processing unit 181 performs a process relating to an OH on the LO-ODU frame, and outputs the result to the demapping unit 182. The demapping unit 182 receives the electric path signal of the LO-ODU frame from the OH processing unit 181, extracts client signals from the received electric path signal, and outputs the result to the transmission unit 183. The transmission unit 183 transmits the client signals extracted by the demapping unit 182.

It should be noted that the client signal receiving unit 120 and the multiplexing processing unit 130 may directly perform input and output of the electric path signal of the LO-ODU frame without through the ODU-SW 210. Furthermore, the separation processing unit 170 and the client signal transmission unit 180 may directly perform input and output of the electric path signal of the LO-ODU frame without through the ODU-SW 210.

Figure 2:
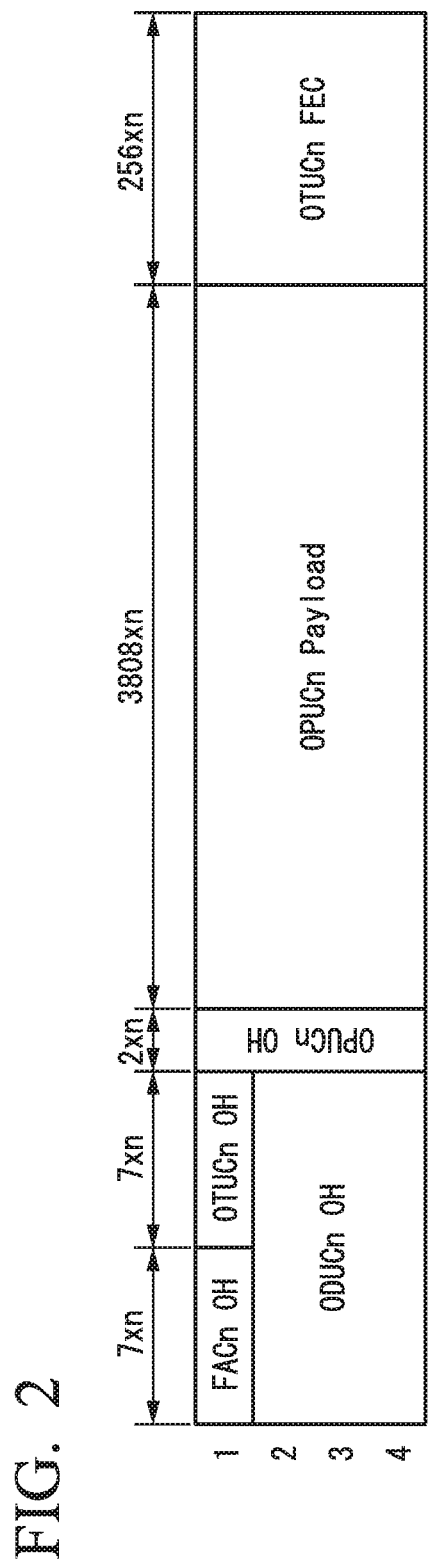
FIG. 2 is a diagram showing a frame structure of an OTUCn.

FIG. 2 is a diagram showing a frame structure of an OTUCn. The OTUCn is generated by adding an FACnOH, an OTUCnOH, an OPUCnOH, and an OTUCnFEC to an ODUCn. The frame structure of the OTUCn is denoted as 4 rows and 4080×n columns. FIG. 2 shows a case in which an FEC of 256 bytes is added per row.

Client signals are mapped into an OPUCn payload of ((7+7+2)×n+1) to 3824×n)-th columns of the OTUCn. An OH is set in first to ((7+7+2)×n)-th columns of the OTUCn frame. The FACnOH is set in first to (7×n)-th columns of the first row of the OH. The FACnOH includes information necessary for frame synchronization. The OTUCnOH is set in (7×n+1)-th to (14×n)-th columns of the first row of the OH. The OTUCnOH accommodates optical channel monitoring information. An ODUCnOH is set in first to (14×n)-th columns of the second to fourth rows of the OH. The ODUCnOH accommodates optical channel path management operation information. The OPUCnOH is set in (14×n+1)-th to (16×n)-th columns. The OPUCnOH accommodates information necessary for mapping and demapping of client signals and the like. The OTUCnFEC is set in (3824×n+1) to (4080×n)-th columns. The OTUCnFEC accommodates parity check bytes for FEC. Generally, when FEC of R bytes per row is added, the FEC is set in (3824×n+1)-th to ((3824+R)×n)-th columns.

Figure 3:
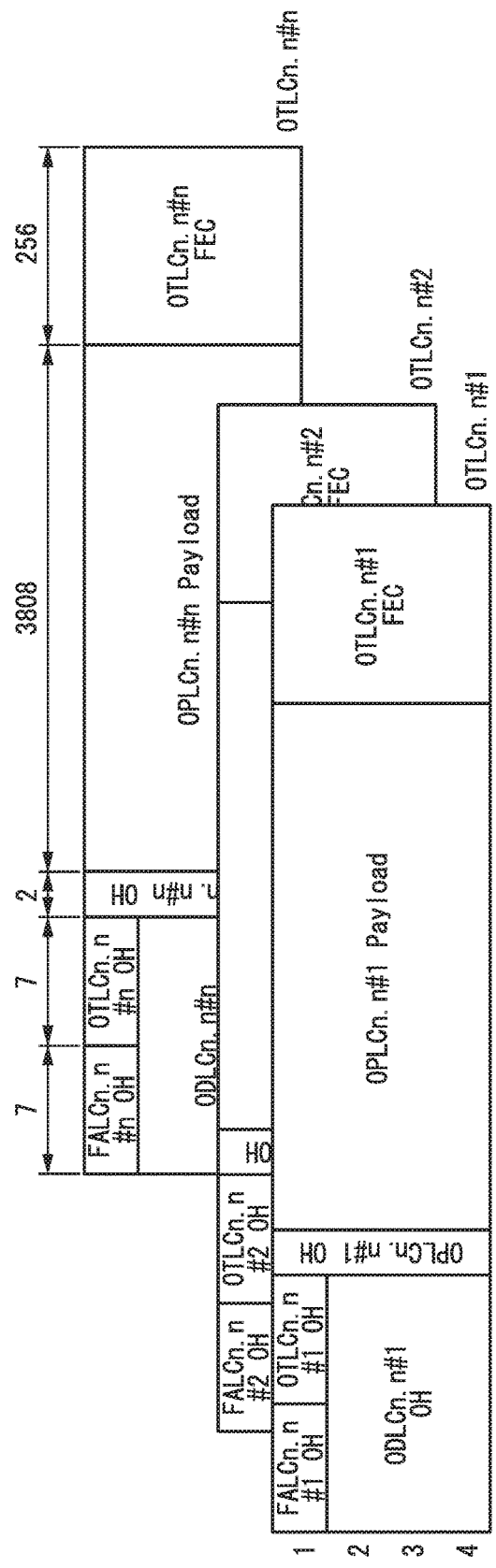
FIG. 3 is a diagram showing a frame structure of an OTLCn.n.

FIG. 3 is a diagram showing a frame structure of an OTLCn.n. The OTLCn.n is denoted as 4 rows and 4080 columns. The OTLCn.n#1 to the OTLCn.n#n are obtained by dividing an OTUCn frame using byte interleaving. The OPUCn payload of the OTUCn is mapped into OPUCn.n#i payloads of 17-th to 3824-th columns of the OTLCn.n#1.

An OH is set in first to 16-th columns of the OTLCn.n#i. The OH of the OTLCn.n#i is set on the basis of the OTUCnOH or the like. An FALCn.n#iOH is set in first to seventh columns in the first row. The FALCn.n#iOH includes information necessary for frame synchronization. An OTLCn.n#iOH is set in eighth to fourteenth columns in the first row. The OTLCn.n#iOH accommodates optical channel section monitoring information. An ODLCn.n#iOH is set in first to (14×n)-th columns in the second to fourth rows. The ODLCn.n#iOH accommodates optical channel path management operation information. An OPLCn.n#iOH is set in fifteenth to sixteenth columns. The OPLCn.n#iOH accommodates information necessary for mapping and demapping of client signals and the like. An OTLCn.n#iFEC is set in 3825-th to 4080-th columns. The OTLCn.n#iFEC accommodates parity check bytes for FEC.

Figure 4A:
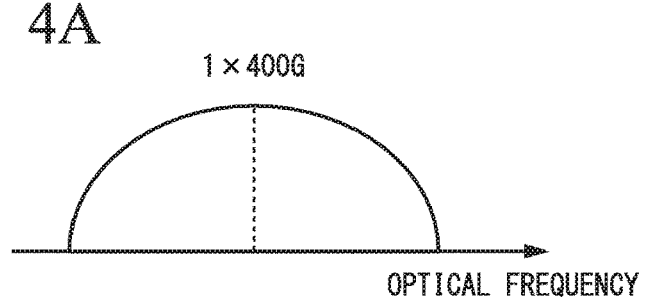
FIG. 4A is a diagram showing an optical channel used for optical signal transport.
Figure 4B:
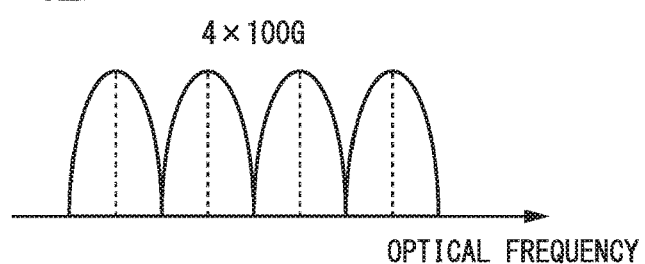
FIG. 4B is a diagram showing an optical channel used for optical signal transport.

FIGS. 4A to 4D are diagrams showing optical channels used for transport of optical signals. FIG. 4A is a diagram showing an optical channel when an optical signal of 400 G is serially transported through one optical carrier, and FIG. 4B is a diagram showing an optical channel when an optical signal of 400 G is parallelly transported (multicarrier transport) through four optical subcarriers. Due to limitation on an operation speed in an electronic circuit, as shown in FIG. 4A, it is difficult to continuously enlarge the capacity of a band in which serial transport can be performed through one optical carrier to exceed 100 G. Thus, in an OTUCn, wide band transport is realized without being affected by limitation on an operation speed of an electronic circuit by parallel transport of a band over 100 G through a plurality of optical subcarriers. For the parallel transport, polarization multiplexing, multi-level modulation, or the like is used. The bands of the optical subcarriers vary depending on a modulation scheme.

Figure 4C:
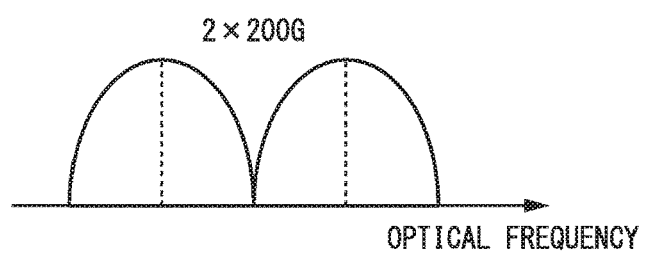
FIG. 4C is a diagram showing an optical channel used for optical signal transport.
Figure 4D:
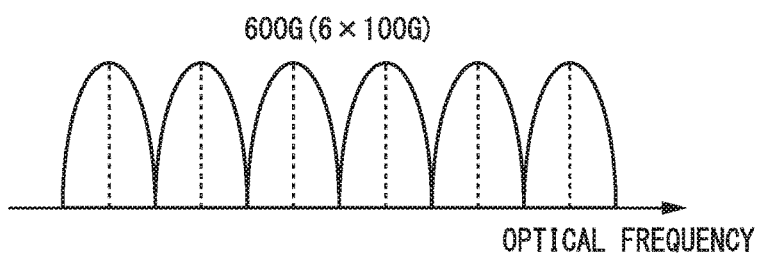
FIG. 4D is a diagram showing an optical channel used for optical signal transport.

FIG. 4B is an example when one optical channel of 400 G is parallelly transmitted through four optical subcarriers of 100 G, and FIG. 4C is an example when one optical channel of 400 G is parallelly transmitted through two optical subcarriers of 200 G. Further, as shown in FIG. 4D, multi-carrier transport has a flexibility capable of increasing a transport band in the unit of 100 G by changing n.

First Embodiment

Figure 5:
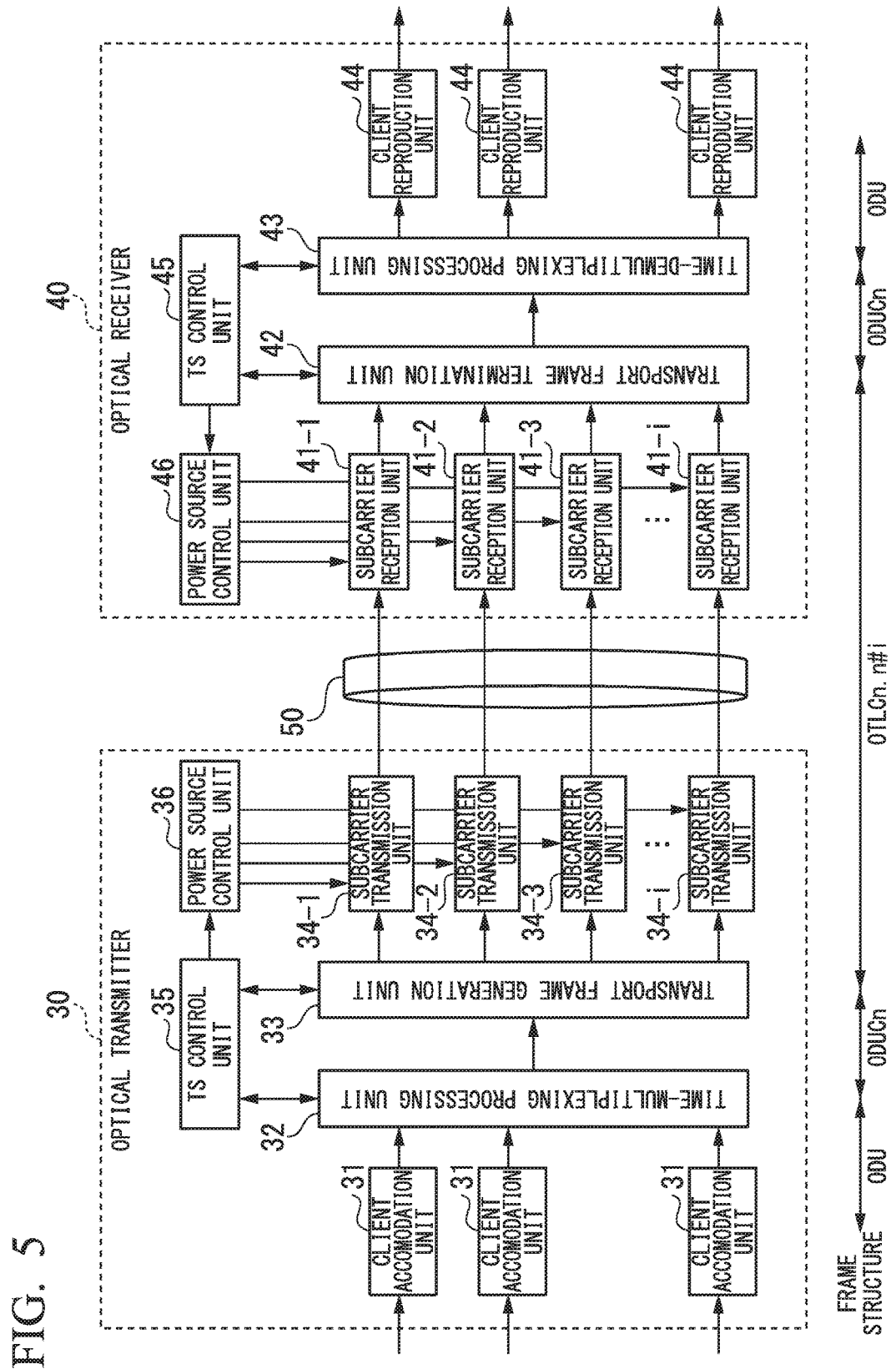
FIG. 5 is a block diagram showing a configuration of an optical transport system in a first embodiment of the present invention.

FIG. 5 is a block diagram showing a configuration of an optical transport system in a first embodiment of the present invention. As shown in the figure, the optical transport system in the first embodiment includes an optical transmitter 30, an optical receiver 40, and a transport path 50 (optical fiber). Further, FIG. 5 shows a frame structure used in the optical transmitter 30 and the optical receiver 40.

The optical transmitter 30 includes a plurality of client accommodation units 31, a time-multiplexing processing unit 32, a transport frame generation unit 33, i subcarrier transmission units 34-1 to 34-$i$, a time slot (TS) control unit 35, and a power source control unit 36. The client accommodation units 31 correspond to the client signal reception unit 120 in FIG. 1. The time-multiplexing processing unit 32 corresponds to the ODU-SW 210 and the multiplexing unit 131 in FIG. 1. The transport frame generation unit 33 corresponds to the framing unit 132 and the line-side transmission processing unit 140 in FIG. 1. Each of the subcarrier transmission units 34-1 to 34-$i$ corresponds to the transmitter 220 in FIG. 1. The optical transmitter 30 in the first embodiment has a configuration in which the TS control unit 35 and the power source control unit 36 are provided, which is different from the configuration of the transmission processing unit 110 in the OTN framer 100 shown in FIG. 1.

The client accommodation unit 31 receives client signals and accommodates the received client signals in a frame structure of electric paths. For example, in the OTN, an ODU is used as the frame structure of the electric paths. The client accommodation unit 31 outputs electric path signals that accommodates the client signals to the time-multiplexing processing unit 32.

The time-multiplexing processing unit 32 time-multiplexes the electric path signals output from the plurality of client accommodation units 31. The time-multiplexing processing unit 32 allocates each of the plurality of input electric path signals to any one of a plurality of time slots included in a transport frame and accommodates the electric path signals in the allocated time slots. The time-multiplexing processing unit 32 accommodates the electric path signals in the time slots of the transport frame to time-multiplex the electric path signals. The time-multiplexing processing unit 32 allocates an electric path signal to one or a plurality of time slots in accordance with the capacity of the electric path signal, for example.

Figure 6:
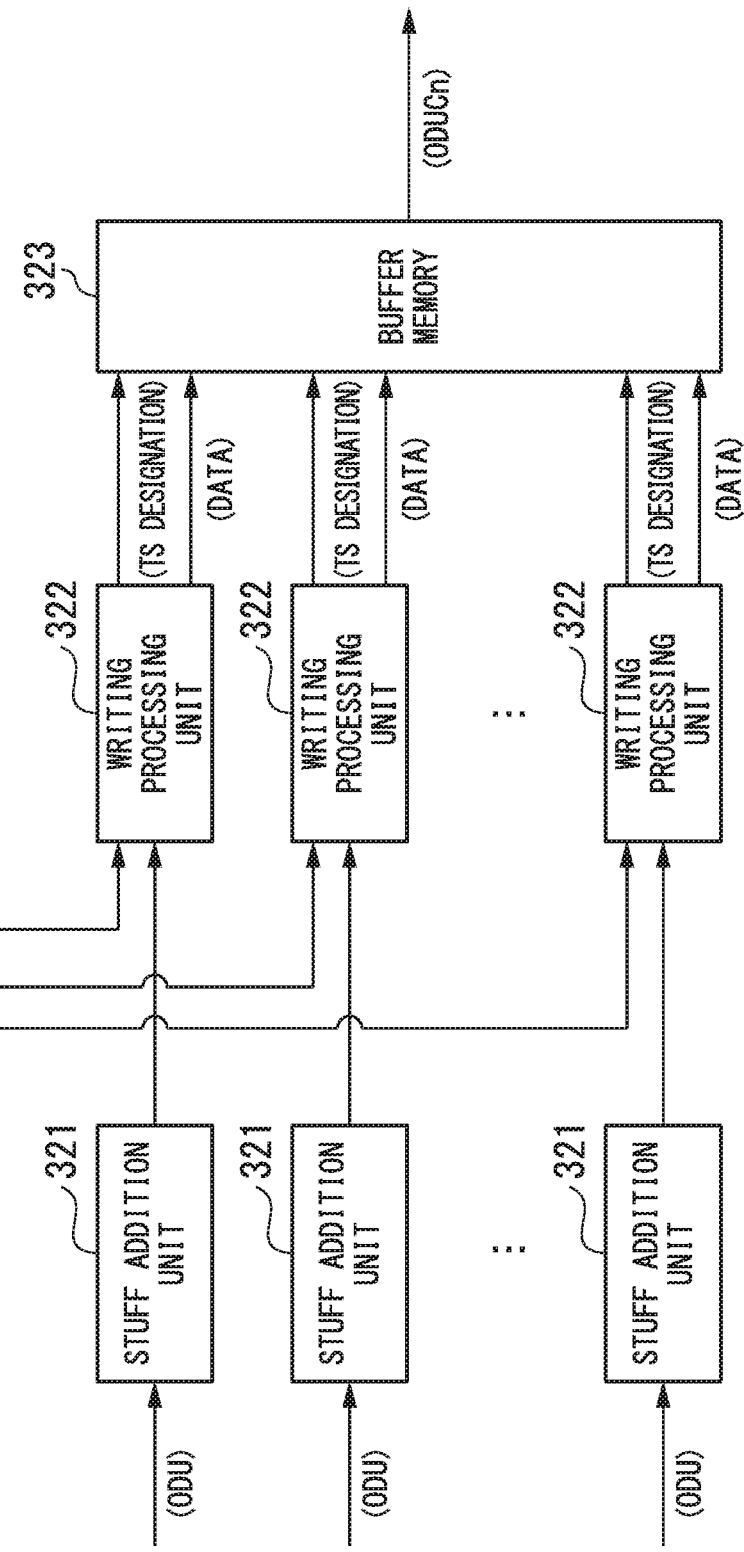
FIG. 6 is a block diagram showing a configuration of a time-multiplexing processing unit 32 in the first embodiment.

FIG. 6 is a block diagram showing a configuration of the time-multiplexing processing unit 32 in the first embodiment. As shown in the figure, the time-multiplexing processing unit 32 includes a plurality of stuff addition units 321, a plurality of writing processing units 322, and a buffer memory 323.

The plurality of stuff addition units 321 are provided so as to correspond to the client accommodation units 31. Each of the stuff addition units 321 receives an input of an electric path signal output from a corresponding client accommodation unit 31. The stuff addition unit 321 adds a stuff byte to the input electric path signal to adjust the input electric path signal to have the same capacity as the capacity of a time slot that accommodates the electric path signal. The stuff addition unit 321 outputs the electric path signal to which the stuff byte is added to the writing processing unit 322.

Each of the plurality of writing processing units 322 is provided so as to correspond to the stuff addition units 321. Each of the writing processing units 322 receives an input of the electric path signal to which the stuff byte is added from the corresponding stuff addition unit 321. The writing processing unit 322 combines a writing address corresponding to a time slot determined for each electric path with data, outputs the result to the buffer memory 323, and writes the data in a region corresponding to the address. Each writing processing unit 322 acquires the writing address from the TS control unit 35. Data to be written in the buffer memory 323 is the electric path signal to which the stuff byte is added.

The buffer memory 323 has a storage capacity larger than the capacity of time slots included in a transport frame. The buffer memory 323 stores data input from each writing processing unit 322, and outputs data stored for each period of one transport frame to the transport frame generation unit 33. It should be noted that the buffer memory 323 may sequentially output the data written by each writing processing unit 322 to the transport frame generation unit 33.

With the above-described configuration, the time-multiplexing processing unit 32 allocates an LO-ODU output from each of the plurality of client accommodation units 31 to a time slot in an HO-ODU to accommodate the LO-ODU in the allocated time slot. When an ODUCn is used as the HO-ODU, the LO-ODU is allocated to n×80 1.25 G time slots included in the ODUCn. When an ODU2 is used as the LO-ODU, because the ODU2 has a band of about 10 G, the ODU2 is allocated to 8 time slots and the ODU2 is accommodated therein. In addition, when an ODU3 is used as the LO-ODU, because the ODU3 has a band of about 40 G, the ODU3 is allocated to 31 time slots and the ODU3 is accommodated therein. It should be noted that a configuration in which the ODUCn has n×80 1.25 G time slots is an example, and the capacity per time slot included in the ODUCn may be a value other than the above-described 1.25 G.

Referring back to FIG. 5, a description about the configuration of the optical transmitter 30 will be continued. The transport frame generation unit 33 adds overhead information to data corresponding to one transport frame output from the time-multiplexing processing unit 32 and adds an error correction code thereto. The transport frame generation unit 33 generates transmission signals by distributing a signal obtained by adding the overhead information and the error correction code to the transmission signals the number of which is equal to the number of subcarriers to be used for transport. The transport frame generation unit 33 outputs the generated transmission signals to the corresponding subcarrier transmission units 34-1 to 34-$i$.

Each of the subcarrier transmission units 34-1 to 34-*i* performs electric-to-optical conversion on a transmission signal output from the transport frame generation unit 33, and outputs an optical signal obtained through the electric-to-optical conversion as a subcarrier signal. The subcarrier signals output from the subcarrier transmission units 34-1 to 34-*i* are generated using optical carriers having different wavelengths. The subcarrier signals output from the subcarrier transmission units 34-1 to 34-*i* are transported to the optical receiver 40 through the transport path 50. When a plurality of subcarrier signals are transported, the same optical fiber of the same path is generally used, but different optical fibers of the same path may be used, or optical fibers of different paths may be used.

The TS control unit 35 performs input and output of control information with the time-multiplexing processing unit 32 and the transport frame generation unit 33. The control information between the TS control unit 35 and the time-multiplexing processing unit 32 includes a writing address when data is written in the buffer memory 323, information for instructing each writing processing unit 322 to change the writing address, and the like. The TS control unit 35 has a time slot utilization situation table, and gives an instruction relating to the writing address to each of the writing processing units 322 on the basis of the table. The control information between the TS control unit 35 and the transport frame generation unit 33 includes information for designating a subcarrier transmission unit 34 to be used for transport among the subcarrier transmission units 34-1 to 34-*i*, and the like. The TS control unit 35 notifies the power source control unit 36 of the subcarrier transmission unit 34 to be used for transport and the subcarrier transmission units 34 that are not to be used for transport, on the basis of the time slot utilization situation table. The power source control unit 36 supplies electric power to the subcarrier transmission unit 34 to be used for transport, and performs a control for stopping the supply of electric power to the subcarrier transmission units 34 that are not to be used for transport.

The optical receiver 40 includes *i* subcarrier reception units 41-1 to 41-*i*, a transport frame termination unit 42, a time-demultiplexing processing unit 43, a plurality of client reproduction units 44, a TS control unit 45, and a power source control unit 46. The subcarrier reception units 41-1 to 41-*i* correspond to the receivers 230 in FIG. 1. The transport frame termination unit 42 corresponds to the line-side reception processing unit 160 and the deframing unit 171 in FIG. 1. The time-demultiplexing processing unit 43 corresponds to the demultiplexing unit 172 and the ODU-SW 210 in FIG. 1. The client reproduction units 44 correspond to the client signal transmission unit 180 in FIG. 1.

The subcarrier reception units 41-1 to 41-*i* are provided corresponding to the subcarrier transmission units 34-1 to 34-*i*, respectively. The subcarrier reception units 41-1 to 41-*i* receive subcarrier signals transmitted from the corresponding subcarrier transmission units 34-1 to 34-*i*. The subcarrier reception units 41-1 to 41-*i* perform optical-to-electric conversion on the received subcarrier signals, and outputs electric signals obtained through the optical-to-electric conversion to the transport frame termination unit 42 as reception signals.

The transport frame termination unit 42 combines the reception signals output from the subcarrier reception units 41-1 to 41-*i* to restore a transport frame. When combining the reception signals, the transport frame termination unit 42 detects a boundary between frames of each of the reception signals, and if there is a difference in transport delay between the frames, compensates for (de-skews) the difference. The transport frame termination unit 42 reads out overhead information of the restored transport frame, and performs error correction decoding using an error correction code added to the transport frame. The transport frame termination unit 42 outputs data corresponding to one transport frame that has been decoded to the time-demultiplexing processing unit 43. It should be noted that the transport frame termination unit 42 may individually perform the error correction decoding on a reception signal of each of the subcarrier reception units 41-1 to 41-*i*, and then may combine the reception signals subjected to the error correction decoding to restore the transport frame.

The time-demultiplexing processing unit 43 performs demultiplexing on data output from the transport frame termination unit 42, and separates the result into a plurality of electric path signals. The time-demultiplexing processing unit 43 outputs the plurality of electric path signals obtained through the separation to the corresponding client reproduction units 44.

Figure 7:
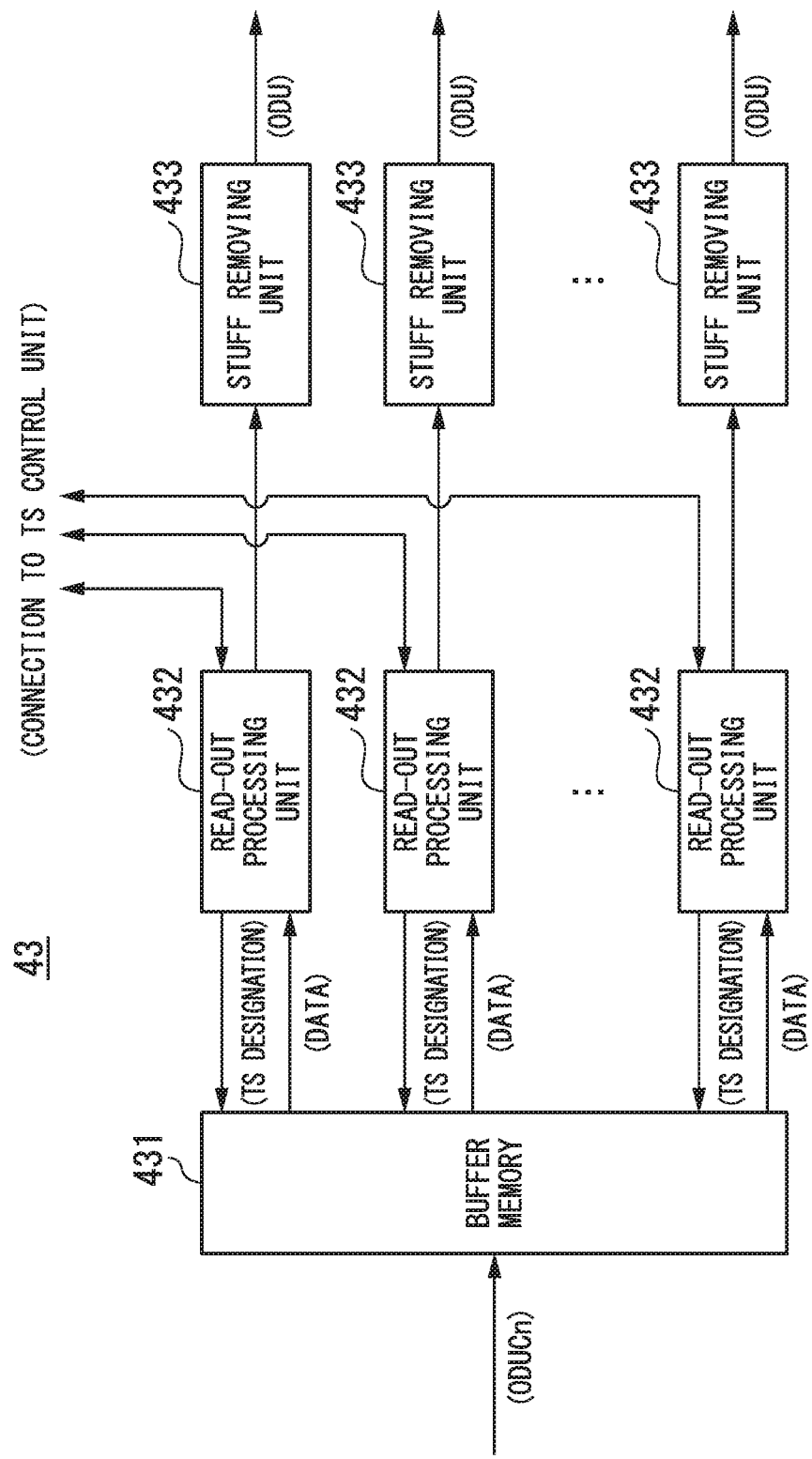
FIG. 7 is a block diagram showing a configuration of a time-demultiplexing processing unit 43 in the first embodiment.

FIG. 7 is a block diagram showing a configuration of the time-demultiplexing processing unit 43 in the first embodiment. As shown in the figure, the time-demultiplexing processing unit 43 includes a buffer memory 431, a plurality of read-out processing units 432, and a plurality of stuff removing units 433.

The buffer memory 431 stores data input from the transport frame termination unit 42 in accordance with an input order. The buffer memory 431 outputs data stored in a storage area designated by a read-out address designated from a read-out processing unit 432 to the read-out processing unit 432. The storage area designated by the read-out address corresponds to a time slot of a transport frame.

The plurality of read-out processing units 432 are provided corresponding to electric paths. The read-out processing units 432 acquire data in the time slots allocated to the corresponding electric paths from the buffer memory 431. Read-out addresses corresponding to the time slots allocated to the electric paths corresponding to the read-out processing units 432 are input to the read-out processing units 432 from the TS control unit 45. The read-out processing units 432 output the read-out addresses acquired from the TS control unit 45 to the buffer memory 431, acquire data stored in storage areas of the read-out addresses, and output the result to the stuff removing units 433.

The plurality of stuff removing units 433 are provided corresponding to the electric paths. Each of the stuff removing units 433 receives an input of data output from a read-out processing units 432 allocated to a corresponding electric path. The stuff removing unit 433 removes a stuff byte added to the input data to extract an original electric path signal, and outputs the extracted electric path signal to the client reproduction unit 44.

Referring back to FIG. 5, a description about the configuration of the optical receiver 40 will be continued. Each of the plurality of client reproduction units 44 is provided corresponding to each of the electric paths. The client reproduction unit 44 receives an input of an electric path signal of a corresponding electric path from the stuff removing unit 433. The client reproduction unit 44 extracts a client signal from the input electric path signal, and transmits the result.

The TS control unit 45 performs input and output of control information with the transport frame termination unit 42 and the time-demultiplexing processing unit 43. The control information between the TS control unit 45 and the transport frame termination unit 42 includes information for designating a subcarrier reception unit 41 to be used for transport among the subcarrier reception units 41-1 to 41-i, and the like. The TS control unit 45 notifies the power source control unit 46 of the subcarrier reception unit 41 to be used for transport and the subcarrier reception units 41 that are not to be used for transport. The power source control unit 46 supplies electric power to the subcarrier reception unit 41 to be used for transport, and performs a control for stopping the supply of electric power to the subcarrier reception units 41 that are not to be used for transport. The control information between the TS control unit 45 and the time-demultiplexing processing unit 43 includes a read-out address when data is read out from the buffer memory 431, information for instructing each of the read-out processing units 432 to change the read-out address, and the like.

In the optical transport system that includes the optical transmitter 30 and the optical receiver 40 having the above-described configurations, an operation when changing time slots in which electric path signals are arranged in a transport frame will be described. The TS control unit 35 of the optical transmitter 30 instructs the time-multiplexing processing unit 32 to change the allocation of time slots after a predetermined period of time elapses (after T frames). The time-multiplexing processing unit 32 changes the allocation of the time slots at a boundary of transport frames after a time corresponding to T frames elapses on the basis of the instruction of the TS control unit 35.

Further, the TS control unit 35 notifies the optical receiver 40 that the allocation of the time slots will be changed after a predetermined period of time using overhead information added by the transport frame generation unit 33. If it is detected that the notification for changing the allocation of the time slots is included in the overhead information of the transport frame, the transport frame termination unit 42 of the optical receiver 40 outputs the notification to the TS control unit 45. If the notification for changing the allocation of the time slots is input from the transport frame termination unit 42, the TS control unit 45 outputs the notification to the time-demultiplexing processing unit 43. The time-demultiplexing processing unit 43 changes the allocation of the time slots at the boundary of the transport frames after the time corresponding to T frames elapses.

Figure 8:
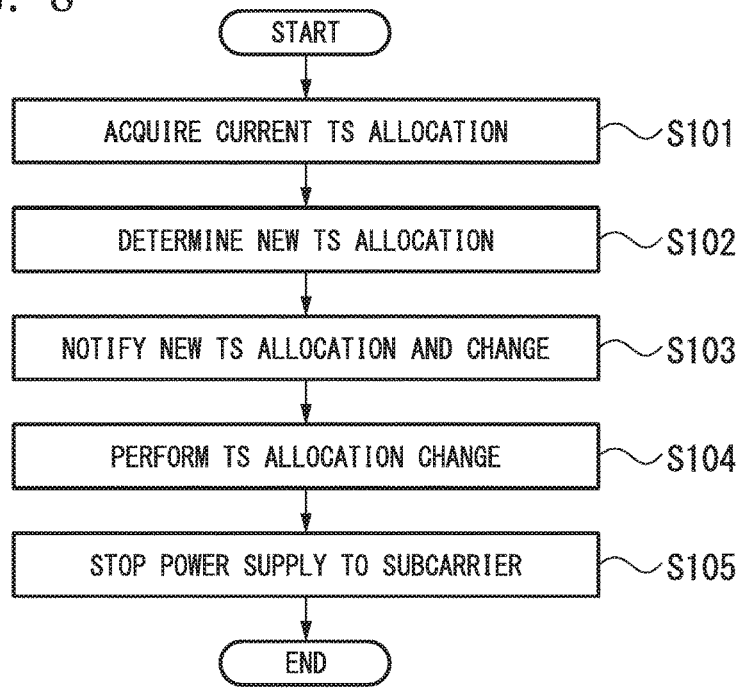
FIG. 8 is a flowchart showing a process when changing time slots to which electric path signals are allocated.

FIG. 8 is a flowchart showing a process when changing time slots to which electric path signals are allocated. In the optical transport system, a process of changing the allocation of time slots is executed when a starting instruction is received from an administrator of the optical transport system, when an index indicating the degree of fragmentation (time slot fragmentation) of time slots of a transport frame exceeds a threshold value, or at a designated timing such as every day, every week, or every month. As the index indicating the degree of fragmentation, for example, a value calculated using Expression (1) may be used.

$$\text{(the number of used subcarriers)} - \text{((the number of used time slots)/(the number of time slots per subcarrier))} \quad (1)$$

For example, when the number of used subcarriers is 4, the number of time slots to which electric path signals are allocated is 20, and the number of time slots per subcarrier is 10, the index indicating the degree of fragmentation is (4−(20/10))=2. Because the index indicates the number of subcarriers that can be saved, when the index is equal to or greater than 1, it is possible to enhance the utilization efficiency of resources by eliminating fragmentation.

In the optical transport system, if the process of changing the allocation of time slots is started, the TS control unit 35 of the optical transmitter 30 acquires the allocation of electric path signals to time slots of a transport frame (step S101). The TS control unit 35 changes the allocation of the electric path signals to the time slots of the transport frame, and determines a new allocation of the time slots for eliminating fragmentation (step S102).

The TS control unit 35 outputs the determined allocation of the time slots and notification for the change of the allocation of the time slots to the transport frame generation unit 33, and transmits the allocation and the notification for the change to the optical receiver 40 through the transport frame generation unit 33. In the optical receiver 40, if the allocation and the notification for the change of the time slots are detected in overhead information of the transport frame received from the optical transmitter 30, the transport frame termination unit 42 outputs the detected allocation and notification to the TS control unit 45 (step S103). It should be noted that the notification for the change of the allocation of the time slots includes information indicating a timing for changing the allocation of the time slots (information indicating a time after T frames).

The TS control unit 35 of the optical transmitter 30 notifies, before a process for a frame for which the time slot allocation is to be changed is executed, the time-multiplexing processing unit 32 of a new allocation, and then changes the allocation of the time slots. The TS control unit 45 of the optical receiver 40 notifies, before the process for the frame for which the time slot allocation is to be changed is executed, the time-demultiplexing processing unit 43 of the new allocation, and then changes the allocation of the time slots (step S104).

The TS control unit 35 performs a control for stopping the supply of electric power to the subcarrier transmission units 34 that do not transport time slots to which electric path signals are allocated in the new allocation, on the power source control unit 36. Similarly, the TS control unit 45 performs a control for stopping the supply of electric power to the subcarrier reception units 41 that do not transport time slots to which electric path signals are allocated in the new allocation, on the power source control unit 46 (step S105).

It should be noted that after change of the allocation, if the subcarrier transmission unit 34 and the subcarrier reception unit 41 that do not transport the time slots to which the electric path signals are allocated are not present, the TS control unit 35 and the TS control unit 45 terminate the process of changing the time slot allocation without performing the control for the power source control unit 36 and the power source control unit 46.

Figure 9:
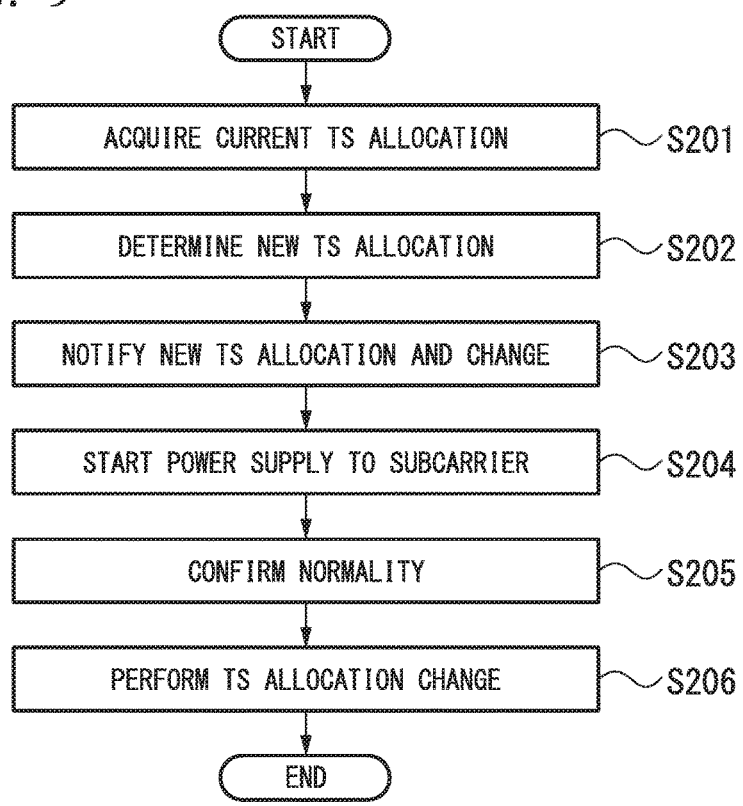
FIG. 9 is a flowchart showing another process when changing time slots to which electric path signals are allocated.

FIG. 9 is a flowchart showing another process when changing time slots to which electric path signals are allocated. While the process shown in FIG. 8 is a process involving decrease in the number of subcarriers to be used, the process shown in FIG. 9 is a process involving increase in the number of subcarriers to be used.

In the optical transport system, if the process of changing the allocation of time slots is started, the TS control unit 35 of the optical transmitter 30 acquires the allocation of each of electric path signals to time slots of a transport frame (step S201). In order to add a new electric path signal or to increase the capacity of an existing electric path signal, the TS control unit 35 changes the allocation of the electric path signals to the time slots of the transport frame, and determines a new allocation of time slots (step S202).

The TS control unit 35 outputs the determined allocation of the time slots and notification for the change of the allocation of the time slots to the transport frame generation unit 33, and transmits the allocation and the notification for the change to the optical receiver 40 through the transport frame generation unit 33. In the optical receiver 40, if the allocation of the time slots and the notification for the change of the allocation are detected in overhead information of the transport frame received from the optical transmitter 30, the transport frame termination unit 42 outputs the detected allocation and notification to the TS control unit 45 (step S203).

The TS control unit 35 performs a control for starting the supply of electric power to a subcarrier transmission unit 34 to which the supply of electric power is stopped among the subcarrier transmission units 34 that transport time slots to which electric path signals are allocated in the new allocation, on the power source control unit 36. Similarly, the TS control unit 45 performs a control for starting the supply of electric power to a subcarrier reception unit 41 to which the supply of electric power is stopped among the subcarrier reception units 41 that transport the time slots to which the electric path signals are allocated in the new allocation, on the power source control unit 46 (step S204).

The TS control unit 35 and the TS control unit 45 causes the transport frame generation unit 33 and the transport frame termination unit 42 to confirm normality of the subcarrier transmission unit 34 and the subcarrier reception unit 41 for which the supply of the electric power is started (step S205).

Before executing a process for a frame for which the time slot allocation is to be changed, the TS control unit 35 of the optical transmitter 30 notifies the time-multiplexing processing unit 32 of the new allocation and causes the time-multiplexing processing unit 32 to change the allocation of the time slots. Before executing a process for a frame for which the time slot allocation is to be changed, the TS control unit 45 of the optical receiver 40 notifies the time-demultiplexing processing unit 43 of the new allocation and causes the time-demultiplexing processing unit 43 to change the allocation of the time slots (step S206).

Figure 10A:
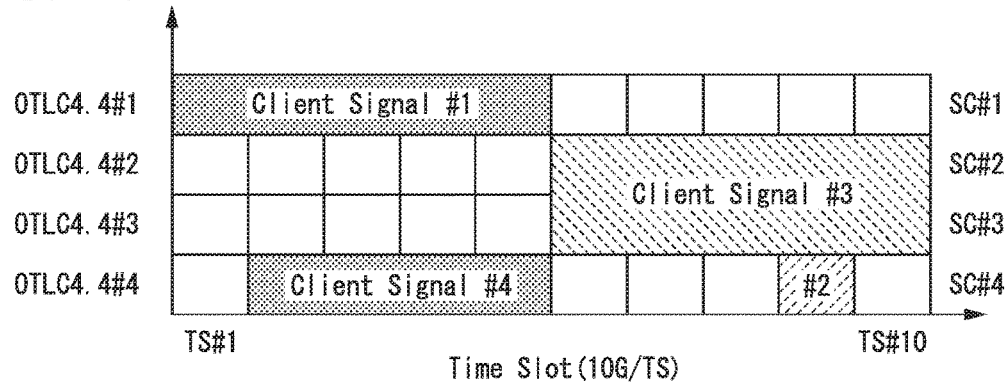
FIG. 10A is a diagram showing an example of change in time slots to which electric path signals are allocated.
Figure 10B:
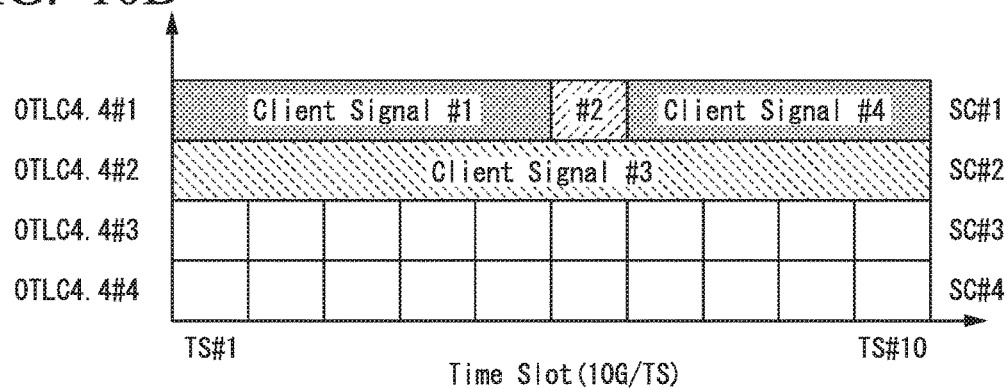
FIG. 10B is a diagram showing an example of change in time slots to which electric path signals are allocated.
Figure 10C:
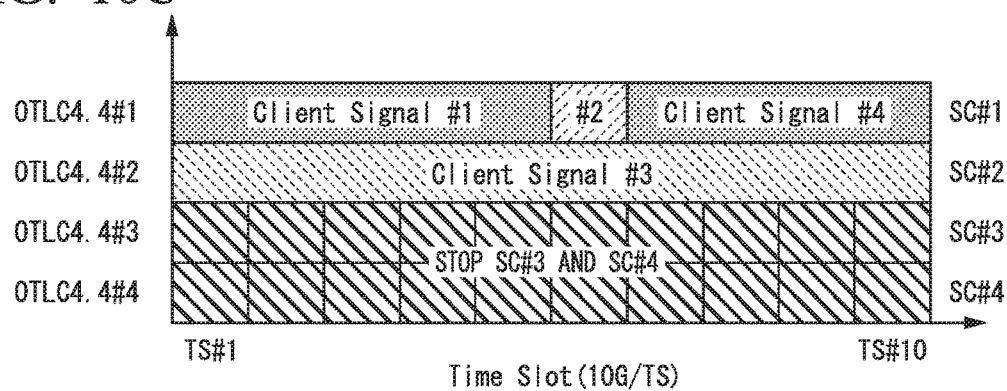
FIG. 10C is a diagram showing an example of change in time slots to which electric path signals are allocated.

FIGS. 10A to 10C are diagrams showing examples of changes in time slots to which electric path signals are allocated. In the examples shown in the figures, transport of 100 G is performed per subcarrier, and transport of 400 G is performed in four subcarriers (SC#1 to SC#4). The capacity of one time slot is set to 10 G, and 10 time slots are included in each subcarrier. In FIGS. 10A to 10C, a longitudinal axis represents a subcarrier, and a lateral axis represents a time slot. FIG. 10A shows a case in which opening and deletion of electric paths multiplexed to a 400 G signal are repeatedly performed and fragmentation occurs. In this case, although traffic (electric path signals) which is actually transported is small, it is necessary to perform transport using all subcarriers, which leads to a waste of resources. Specifically, only 20 time slots among 40 time slots, that is, only traffic corresponding to 200 G is accommodated, but four subcarriers are all operated, which causes a waste of resources.

FIG. 10B shows the allocation of time slots after change of the allocation of the time slots shown in FIG. 10A. By changing the allocation of the time slots with respect to four electric path signals, it is possible to transport the four electric path signals without allocating electric path signals to two subcarriers (SC#3 and SC#4). Here, as shown in FIG. 10C, by stopping the supply of electric power to the subcarrier transmission units 34 and the subcarrier reception units 41 corresponding to the two subcarriers (SC#3 and SC#4), it is possible to enhance the utilization efficiency of resources.

In the allocation of the time slots shown in FIG. 10A, the index indicating the degree of fragmentation calculated by Expression (1) is (4−(20/10))=2. In the allocation of the time slots shown in FIG. 10C, the index indicating the degree of fragmentation calculated by Expression (1) is (2−(20/10)) =0. In this way, by changing the allocation of the time slots, the utilization efficiency of the resources is enhanced.

Figure 11:
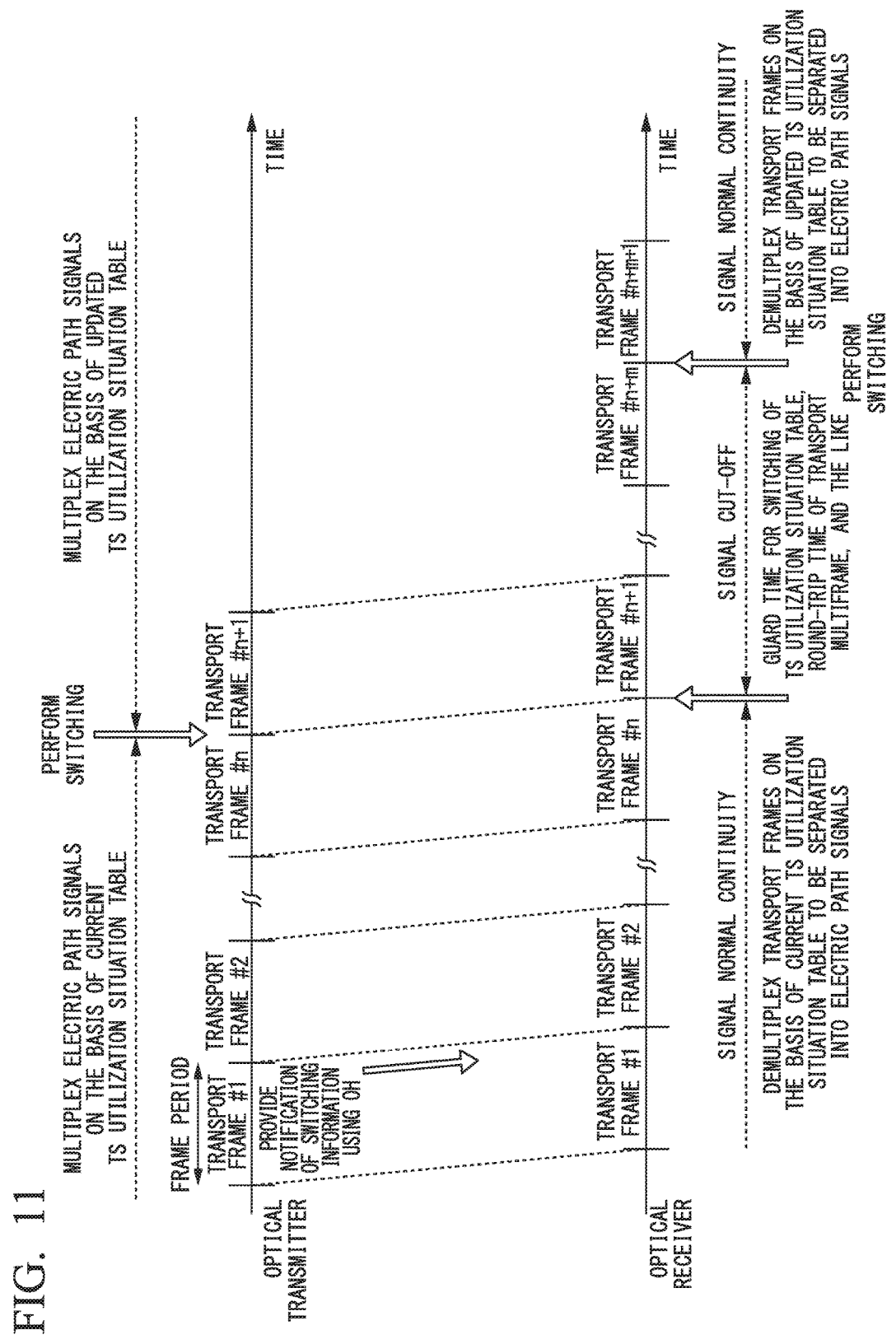

FIG. 11 is a diagram showing an operation example of the optical transmitter 30 and the optical receiver 40. In the figure, a lateral axis represents time. The optical transmitter 30 notifies the optical receiver 40 of switching information in a transport frame #1. The switching information includes information indicating a new allocation of time slots and information indicating a timing for switching to multiplexing using this allocation. It should be noted that instead of the new allocation of time slots, information indicating the changed portions in the new allocation of time slots from the current allocation of time slots may be included in the switching information. In the example shown in FIG. 11, at a boundary between a transport frame #n and a transport frame #n+1, the allocation of electric path signals to time slots is switched. That is, in the example shown in FIG. 11, information indicating that the allocation is switched after n transport frames is included in the switching information.

Up to the transport frame #n, the optical transmitter 30 time-multiplexes electric path signals in transport frames on the basis of the current allocation of time slots. On and after the transport frame #n+1, the optical transmitter 30 time-multiplexes electric path signals in transport frames on the basis of the new allocation of time slots.

FIGS. 12A and 12B are diagrams showing an example of a time slot utilization situation table included in the TS control unit 35. In the figures, the time slot utilization situation table corresponding to the allocation shown in FIG. 10A is shown. In the time slot utilization situation table, for each time slot, an electric path signal allocated to the time slot is associated with the time slot. With respect to a time slot to which an electric path signal is not allocated, "empty" indicating that the time slot is not being used is associated with the time slot. FIGS. 13A and 13B are diagrams showing another example of a time slot utilization situation table included in the TS control unit 35. In the figures, the time slot utilization situation table corresponding to the allocation shown in FIG. 10B is shown.

Here, a procedure of determining a new allocation when the TS control unit 35 changes the allocation of electric path signals to time slots will be described with reference to FIGS. 12A and 12B and FIGS. 13A and 13B. In the following description, a time slot TS#1 of a subcarrier SC#1 is set as the first time slot and a time slot TS#10 of a subcarrier SC#4 is set as the last time slot.

When determining a new allocation, the TS control unit 35 sequentially searches for an electric path signal allocated to a time slot from the last time slot toward the first time slot. In the example shown in FIGS. 12A and 12B, once the search is started sequentially from the time slot TS#10 of the subcarrier SC#4, an electric path signal (Client Signal #2) is detected in a time slot TS#9 of the subcarrier SC#4.

If an electric path signal allocated to a time slot is detected, the TS control unit 35 sequentially searches for a time slot to which an electric path signal is not allocated from the first time slot. In the example shown in FIGS. 12A and 12B, once the search is started sequentially from the time slot TS#1 of the subcarrier SC#1, a time slot to which an electric path signal is not allocated is detected in a time slot TS#6 of the subcarrier SC#1.

If a time slot to which an electric path signal is not allocated is detected, the TS control unit 35 allocates the detected electric path signal to the time slot. In the example shown in FIGS. 12A and 12B, the detected electric path signal (Client Signal #2) is allocated to the time slot TS#6 of the subcarrier SC#1.

The TS control unit 35 repeats the process, and aggregates time slots to which electric path signals are allocated on the leading side and aggregates time slots to which electric path signals are not allocated on the trailing side. By repeating the process by the TS control unit 35, in the example shown in FIGS. 12A and 12B, the allocation of an electric path signal (Client Signal #4) to time slots TS#2 to TS#5 of the subcarrier SC#4 is changed to time slots TS#7 to TS#10 of the subcarrier SC#1. In addition, the allocation of an electric path signal (Client Signal #3) to time slots TS#6 to TS#10 of a subcarrier SC#3 is changed to time slots TS#1 to TS#5 of a subcarrier SC#2. As a result, the allocation shown in FIGS. 13A and 13B is determined as a new allocation of time slots for electric path signals (Client Signal #1 to #4).

Next, another example relating to change of time slots to which electric path signals are allocated will be described.

First, the background of this example will be described. With respect to a modulation scheme of optical subcarriers, it is preferable that the number of subcarriers is small from a viewpoint of resources of wavelengths and the cost of apparatuses. However, when determining the modulation scheme, a modulation scheme in which a transportable distance (transport distance) is longer than a distance over which transport is actually performed is selected.

Transport distances vary depending on modulation schemes, and they are in the order of QPSK>8QAM>16QAM. A transport rate of QPSK is "basic rate×2 bits", a transport rate of 8QAM is "basic rate×3 bits", and a transport rate of 16QAM is "basic rate×4 bits". When an optical transport band is constant, the numbers of subcarriers are in the order of QPSK>8QAM>16QAM.

In B100 G transport, 25 G is generally used as a basic rate. Further, for example, in the case of 1SC-DP-8QAM, a transport band is 1(SC)×2(DP)×3×25=150 G; and consistency in accommodating client signals in the unit of 100 G is poor. Thus, in many cases, QPSK is used even in a distance over which 16QAM transport is impossible and 8QAM transport is possible.

In recent years, standards for client signals of less than 100 G; such as 25 G/50 G Ethernet (registered trademark) or FlexEthernet whose band is variable in the unit of 5 G, have been established. Because consistency of 8QAM is enhanced due to increase of client signals less than 100 G, opportunities for using 8QAM increase.

However, because an OTUCn frame has a unit of 100 G regardless of a band of an optical subcarrier, when the band of the optical subcarrier is not a multiple of 100 G, a fractional band should be considered. For example, in the case of 1SC-DP-8QAM, because the band of the optical subcarrier is 150 G, a band of 50 G (time slots) in an OTUC2 frame cannot be used, and thus it is necessary to explicitly specify an area (time slots) in which a client signal is not accommodated.

A band of one OTLC4.4 frame is 100 G. Assuming that a band of one time slot is set to 5 G and two OTLC4.4 frames are set as one set, the band is 200 G to the maximum, and the number of time slots is 40 to the maximum. When information of 150 G is accommodated per subcarrier, 30 time slots (150 G) is set to be usable, and the remaining 10 time slots (50 G) are set to be unusable.

When the number of OTLC4.4 frames is n and the number of usable time slots is M, this is denoted as OTUCn-M. For example, when 30 time slots are usable in two OTLC4.4 frames, this is denoted as OTUC2-30.

Generally, when the number of subcarriers is N, a band of one subcarrier is BWSC (gigabits per second), and a band of one time slot is BWTS (gigabits per second), M=N×Ceil (BWSC/BWTS) and n=N×Ceil (BWSC/100). It should be noted that the Ceil (x) is a function for assigning a minimum integer which is equal to or greater than x.

Figure 14A:
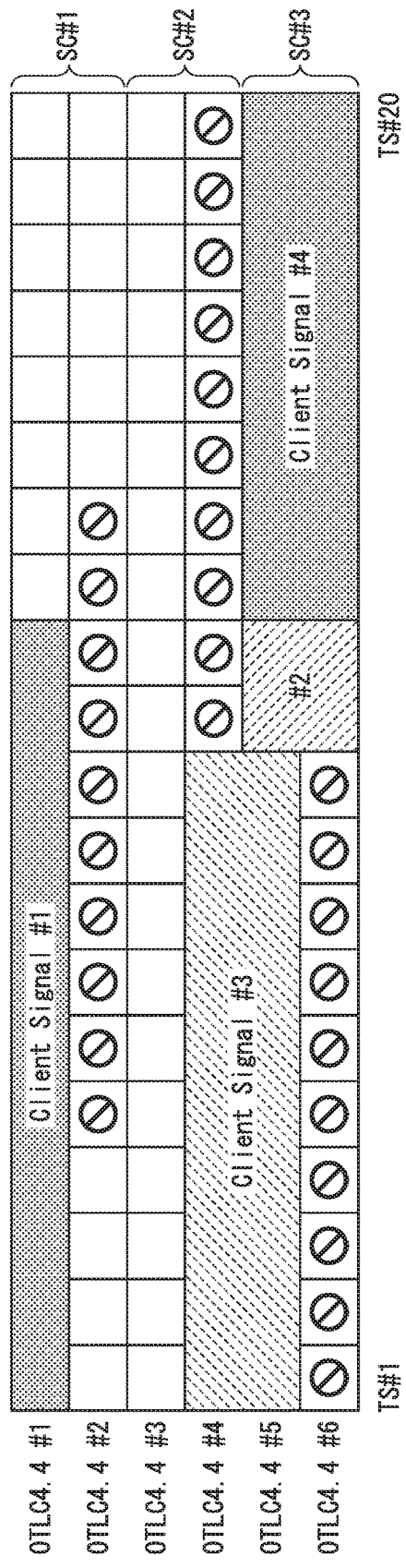
FIG. 14A is a diagram showing another example of change in time slots to which electric path signals are allocated.
Figure 14B:
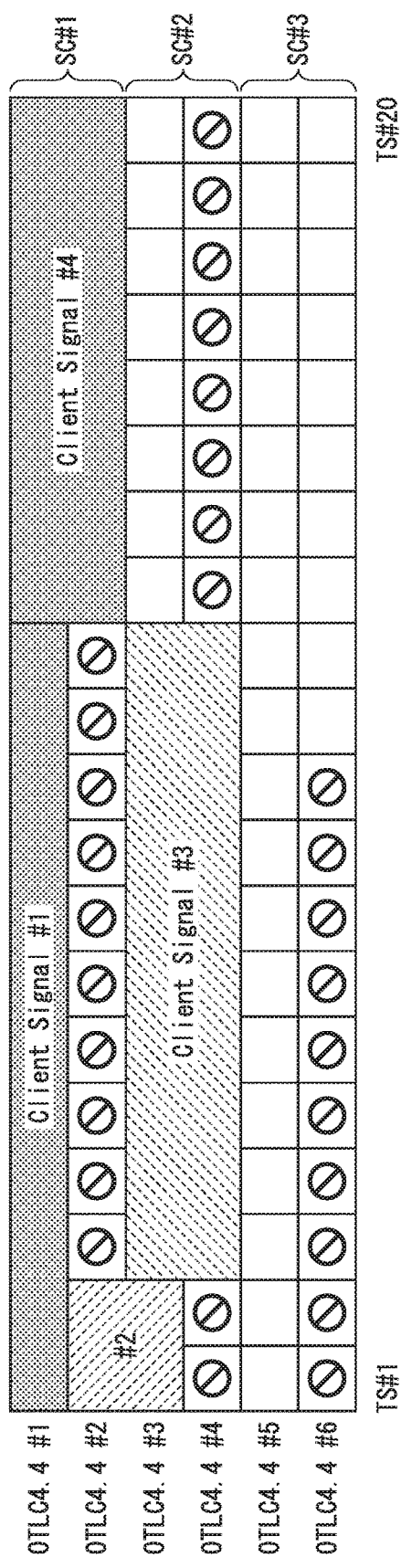
FIG. 14B is a diagram showing another example of change in time slots to which electric path signals are allocated.
Figure 14C:
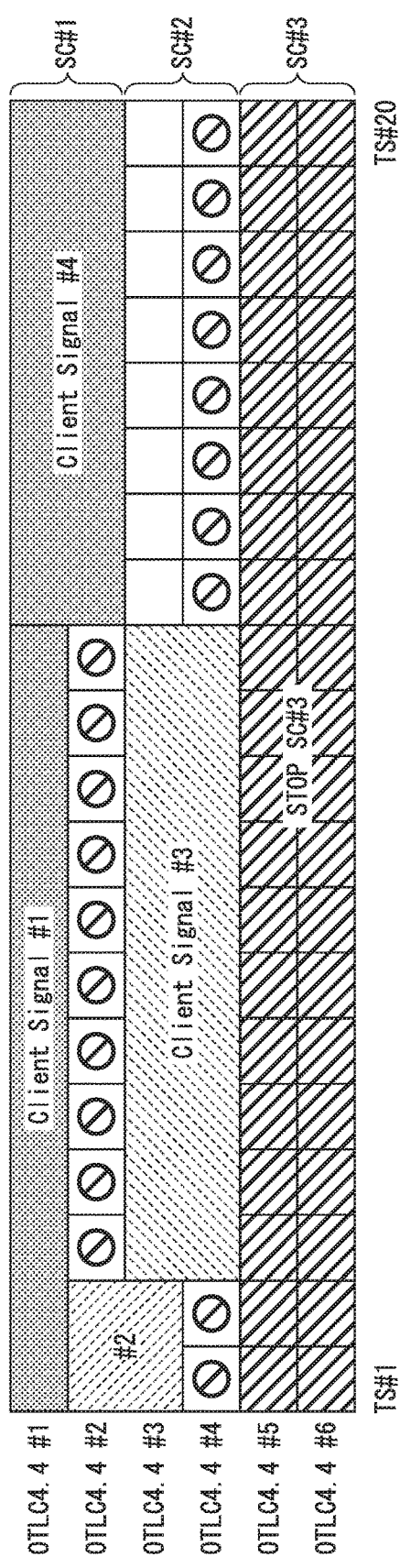
FIG. 14C is a diagram showing another example of change in time slots to which electric path signals are allocated.

FIGS. 14A to 14C show an example of change in time slots to which electric path signals are allocated when the above-described background is considered. In the figures, time slots having a symbol which is a combination of a circle and a backslash show unusable bands (time slots). In the example shown in the figures, transport of 150 G is performed per subcarrier, and transport of 450 G is performed in three subcarriers (SC#1 to SC#3).

Because two OTLC4.4 frames are necessary per subcarrier, six (three sets of) OTLC4.4 frames are necessary for transport of 450 G. That is, FIGS. 14A to 14C show the case of OTUC6-90.

It should be noted that usable time slots (or unusable time slots) can be arbitrarily disposed in each set of OTLC4.4. Further, when there is no information to be accommodated, the usable time slots become empty.

FIG. 14A shows a state in which opening and deletion of electric paths are repeated and fragmentation occurs in the allocation of time slots. Client signals are accommodated in only 52 (260 G) time slots among usable 90 time slots, but all of three subcarriers are operated, and thus resources are wasted.

FIG. 14B shows the allocation of time slots after the allocation of the time slots shown in FIG. 14A is changed. In FIG. 14B, even though electric path signals are not allocated to one subcarrier (SC#3), it is possible to transport four electric path signals. Here, as shown in FIG. 14C, by stopping the supply of electric power to the subcarrier transmission unit 34 and the subcarrier reception unit 41 corresponding to one subcarrier (SC#3), it is possible to enhance the utilization efficiency of resources.

It should be noted that as the index indicating the degree of fragmentation, for example, a value calculated by Expression (2) may be used.

(the number of used subcarriers)−((the number of used time slots)/(the number of time slots per subcarrier−the number of unusable time slots per subcarrier))     (2)

A procedure for determining a new allocation in the TS control unit 35 is basically the same as the procedure described with reference to FIGS. 12A to 13B. A difference between this procedure and the above-described procedure is in that unusable time slots in addition to time slots in which electric path signals are allocated are searched for, and that unusable time slots of the same number (10 in the shown example) are included in each subcarrier. Further, because the positions of usable time slots and the positions of unusable time slots can be exchanged within the same subcarrier, FIGS. 14B and 14C shows a state after empty time slots and unusable time slots are exchanged at some positions.

In addition, information about the time slot allocation in a time slot utilization situation table includes information about the positions of unusable time slots.

FIGS. 15A to 15F are diagrams showing an example of a time slot utilization situation table included in the TS control unit 35. The figures show a time slot utilization situation table corresponding to the allocation shown in FIG. 14A.

FIGS. 16A to 16F are diagrams showing an example of a time slot utilization situation table included in the TS control unit 35. The figures show a time slot utilization situation table corresponding to the allocation shown in FIG. 14B.

It should be noted that in the case of the other example, the subcarrier transmission unit 34 converts signals of time slots excluding unusable time slots into optical signals on the basis of the time slot utilization situation table, and outputs the obtained optical signals as subcarrier signals.

Next, FIGS. 17A and 17B are diagrams showing an example of a time slot utilization situation table in the OTN. In the OTN, a multiplex structure identifier (MSI) as shown in the figures is used. The TS control unit 35 of the optical transmitter 30 notifies the TS control unit 45 of the optical receiver 40 of the time slot utilization situation table shown in FIGS. 12A and 12B, FIGS. 13A and 13B, FIGS. 15A to 15F, FIGS. 16A to 16F, or FIGS. 17A and 17B and timing information for changing the allocation of time slots to electric path signals, for example, using an unused area of overhead information of a transport frame.

Figure 18:
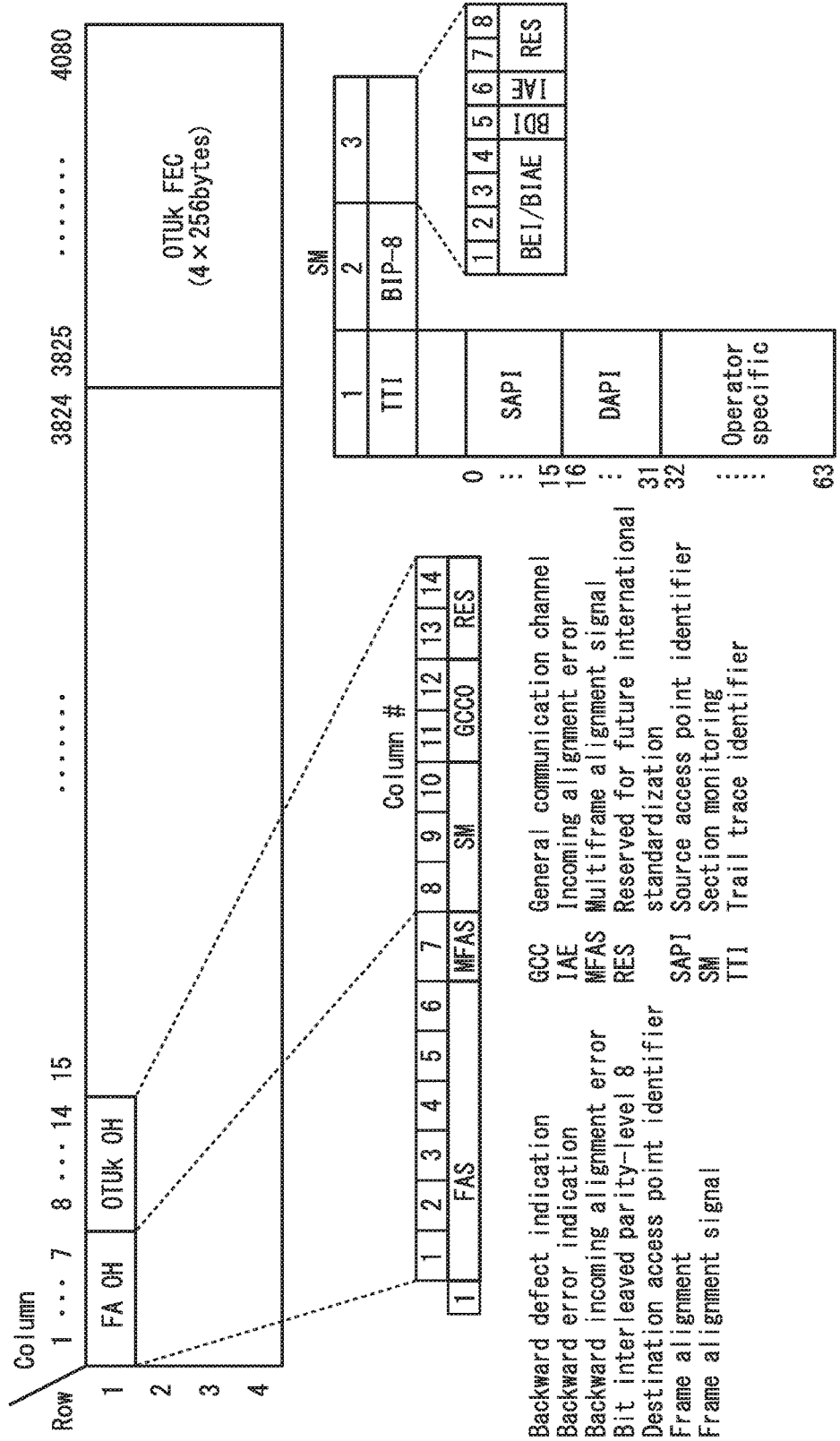
FIG. 18 is a diagram showing a frame structure of an OTUk.

In the case of the OTN, the notification to the TS control unit 45 from the TS control unit 35 is performed by using an unused area of an overhead shown in FIG. 18 or 19 (reservation (RES) bytes, a general communication channel (GCC)) or the like. FIG. 18 is a diagram showing a frame structure of an OTUk. In the OTUk frame structure, GCC0 or RES in an OTUkOH from the eleventh column to the fourteenth column in the first row can be used for notification. FIG. 19 is a diagram showing a frame structure of an ODUk. In the ODUk frame structure, RES from the first column to the second column in the second row in ODU-kOH, GCC1 and GCC2 from the first column to the fourth column in the fourth row, RES from the ninth column to the fourteenth column in the fourth row, or the like, can be used for notification.

In the case of the OTN, the MSI has a number of protection stages for enhancing resistance to a bit error, and the optical receiver 40 receives, in notification of a new time slot utilization situation table (MSI), the same MSI from the optical transmitter 30 a predetermined number of times, and then starts using the new MSI. Further, because the MSI is notified from the optical transmitter 30 to the optical receiver 40 using a plurality of transport frames called a multi-frame, a waiting time for one round of the multi-frame may occur. In the case of the OTN, the MSI is notified once for 256 frames. Accordingly, in such a transient state, as shown in FIG. 11, it is not possible for the optical receiver 40 to correctly time-demultiplex time-multiplexed signals to separate electric path signals during a period from the transport frame #n+1 to a transport frame #n+m, which causes signal cut-off. In a transport frame #n+m+1 and thereafter, the optical receiver 40 can separate electric path signals by time-demultiplexing transport frames using a new MSI.

With respect to handling of signals after stop of the supply of electric power to the subcarrier transmission unit 34 and the subcarrier reception unit 41, the following operation may be considered. As shown in FIG. 10C, in a transport path having a total capacity of 400 G in four subcarriers, when the supply of electric power to two subcarriers is stopped and the capacity of the transport path is set to 200 G, the capacity of the transport path may be handled as 400 G. In this case, a network management system can handle the capacity of the transport path as 400 G. If traffic increases and exceeds 200 G, the optical transmitter 30 and the optical receiver 40 restart, in the background, the supply of electric power to the subcarrier transmission unit 34 and the subcarrier reception unit 41 for which the supply of electric power is stopped to accommodate the increased client signals. The network management system can perform management without controlling the stop and restart of use of subcarriers.

Further, as another operation, the capacity of the transport path may be handled as 200 G after the use of the subcarriers is stopped. In this case, the network management system detects decrease in capacity due to the stop of the use of the subcarriers. If traffic increases, the use of the subcarriers is restarted, and the capacity is changed from 200 G to 300 G or 400 G. For example, in the case of the OTN, the former operation corresponds to an operation of handling a transport path of an OTUC4 as it is even after the use of the subcarriers is stopped, and a latter operation corresponds to an operation of changing the transport path of the OTUC4 to a transmission path of an OTUC2 after the use of the subcarriers is stopped.

In multicarrier transport, a frame structure in which overhead bytes for signal management are provided for each of signals transported in each subcarrier may be used. In this frame structure, there is a case in which a certain subcarrier has overhead information as a representative subcarrier of a transport path, a case in which all subcarriers have the same overhead information, or a case in which both the cases are mixed depending on the type of the overhead information. When the supply of electric power to a subcarrier is stopped in eliminating fragmentation of time slots, handling of the overhead information should also be considered.

For example, when only a specific subcarrier has overhead information, the subcarrier is handled as the representative subcarrier and the allocation to time slots is changed so that the supply of electric power to the representative subcarrier is continued. Specifically, an electric path signal is preferentially allocated to time slots corresponding to the representative subcarrier, or when the supply of electric power to the representative subcarrier is stopped, a subcarrier to which an electric path signal is allocated is changed to the representative subcarrier.

As described above, in accordance with the optical transport system in the first embodiment, when fragmentation occurs in the allocation of time slots in multicarrier transport by, for example, the repetitive opening and deletion of electric paths, the allocation of electric path signals to time slots is changed. Here, if there is a subcarrier to which an electric path signal is not allocated, by stopping operations of the subcarrier transmission unit 34 and the subcarrier reception unit 41 corresponding to the subcarrier, it is possible to enhance the utilization efficiency of resources.

Second Embodiment

In the optical transport system in the first embodiment, when changing the allocation to time slots, signal cut-off occurs in the optical receiver 40 due to a guard time during which the same MSI is received a predetermined number of times and then use of a new MSI is started, a round-trip time of a transport multi-frame, or the like (FIG. 11). In an optical transport system in the second embodiment, an operation of preventing signal cut-off when changing the allocation of electric path signals to time slots is performed. In the optical receiver 40 in the second embodiment, setting of the guard time when switching a time slot utilization situation table is temporarily released, and the MSI is changed without receiving the same MSI a predetermined number of times.

Figure 20:
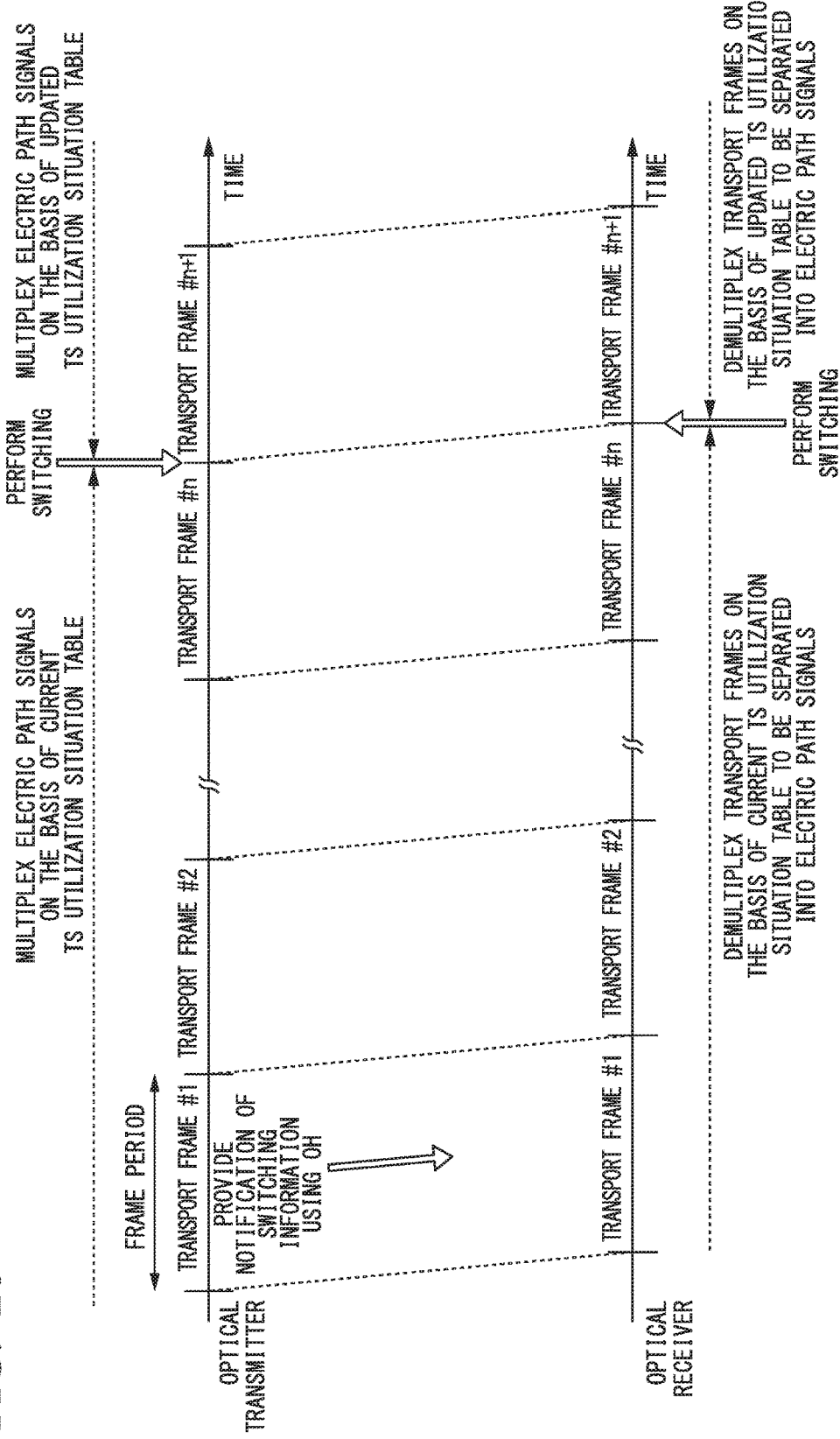
FIG. 20 is a diagram showing an example of operation of an optical transmitter 30 and an optical receiver 40 in a second embodiment.

FIG. 20 is a diagram showing an operation example of the optical transmitter 30 and the optical receiver 40 in the second embodiment. In FIG. 20, a lateral axis represents time. The optical receiver 40 receives an updated time slot utilization situation table within a period from a transport frame #1 to a transport frame #n. The optical receiver 40 separates electric path signals by demultiplexing a transport frame using the updated time slot utilization situation table from a transport frame #n+1 without providing a guard time on and after the transport frame #n.

It should be noted that in order to increase bit error resistance in transport of the time slot utilization situation table, the optical transmitter 30 may transmit the updated time slot utilization situation table within the period from the transport frame #1 to the transport frame #n to the optical receiver 40 a plurality of times. Thus, even when a bit error occurs in transport of the time slot utilization situation table, it is possible to prevent demultiplexing from being mistakenly performed by the optical receiver 40. Further, in the optical transmitter 30, a timing when multiplexing based on the updated time slot utilization situation table is started may be set so that a round-trip time of a transport multi-frame is included, and the time slot utilization situation table may be transported to the optical receiver 40 beforehand.

At a boundary between the transport frame #n and the transport frame #n+1, the TS control unit 35 changes a writing address with respect to each writing processing unit 322, and the TS control unit 45 changes a read-out address with respect to each read-out processing unit 432, so that the time slot utilization situation table is switched.

In accordance with the optical transport system in the second embodiment, when eliminating fragmentation in the allocation of electric path signals to time slots, it is possible to switch the time slot utilization situation table without causing signal cut-off.

Third Embodiment

Figure 21:
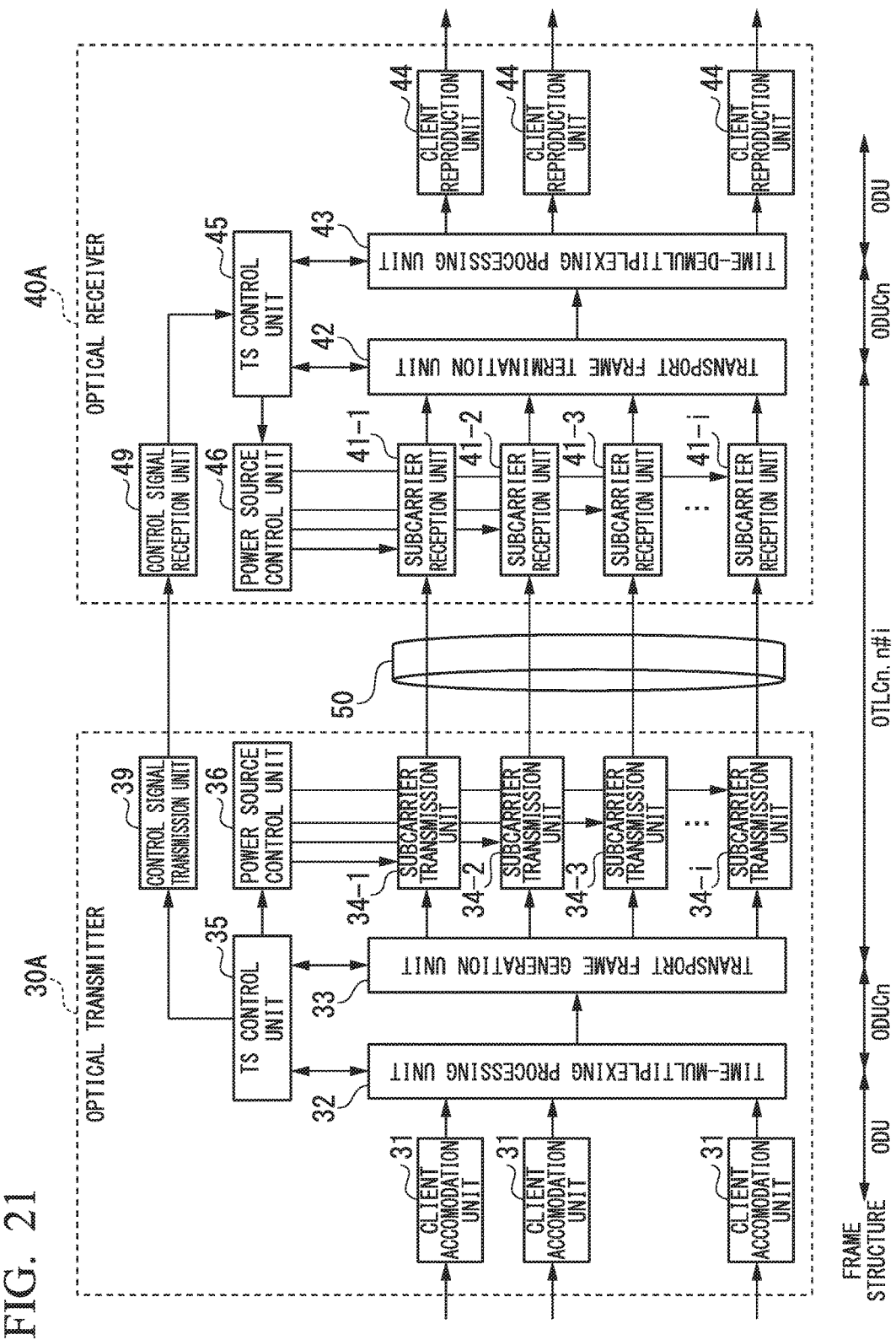
FIG. 21 is a block diagram showing a configuration of an optical transport system according to a third embodiment.

In the optical transport system in the first and second embodiments, switching information is transported using an overhead of a transport frame which serves as a main signal. In an optical transport system in accordance with a third embodiment, switching information is transported using a supervisory channel which is a signal having a wavelength that is different from that of the main signal, or using another communication path. FIG. 21 is a block diagram showing a configuration of the optical transport system in the third embodiment. As shown in the figure, the optical transport system in the third embodiment includes an optical transmitter 30A, an optical receiver 40A, and a transport path 50.

The optical transmitter 30A includes a plurality of client accommodation units 31, a time-multiplexing processing unit 32, a transport frame generation unit 33, i subcarrier transmission units 34-1 to 34-i, a TS (time slot) control unit 35, a power source control unit 36, and a control signal transmission unit 39. In the optical transmitter 30A, the same reference symbols are given to the same structural components as the structural components of the optical transmitter 30, and a description thereof will be omitted. The control signal transmission unit 39 receives an input of switching information from the TS control unit 35, and transmits the switching information to the optical receiver 40A through a path different from the transport path 50. The TS control unit 35 outputs the switching information to the control signal transmission unit 39, instead of outputting the switching information to the transport frame generation unit 33.

The optical receiver 40A includes i subcarrier reception units 41-1 to 41-i, a transport frame termination unit 42, a time-demultiplexing processing unit 43, a plurality of client reproduction units 44, a TS control unit 45, a power source control unit 46, and a control signal reception unit 49. In the optical receiver 40A, the same reference symbols are given to the same structural components as the structural components of the optical receiver 40, and a description thereof will be omitted. The control signal reception unit 49 receives the switching information transmitted from the control signal transmission unit 39, and outputs the switching information to the TS control unit 45. The TS control unit 45 receives an input of the switching information from the control signal reception unit 49, instead of receiving an input of the switching information from the transport frame termination unit 42.

In accordance with the optical transport system in the third embodiment, when eliminating fragmentation in the allocation of electric path signals to time slots, it is possible to transport switching information at an arbitrary timing and to switch the time slot utilization situation table without causing signal cut-off.

Fourth Embodiment

Wavelength division multiplexing (WDM) may be applied to the optical transport systems in the first, second, and third embodiments. An optical transport system in a fourth embodiment is an optical transport system to which the wavelength division multiplexing is applied. FIG. 22 is a block diagram showing a configuration of the optical transport system in the fourth embodiment. As shown in the figure, the optical transport system in the fourth embodiment includes a plurality of optical transmitters 30, a wavelength multiplexing unit 61, a transport path 50, a wavelength separation unit 62, and a plurality of optical receivers 40. Because the optical transmitters 30 and the optical receivers 40 in the fourth embodiment have the same configurations as those of the optical transmitter 30 and the optical receiver 40 (FIG. 5) in the first embodiment, a repetitive description will be omitted.

The wavelength multiplexing unit 61 multiplexes optical signals having different wavelengths output from the optical transmitters 30, and outputs the result to one transport path 50 (optical fiber). The wavelength separation unit 62 separates the optical signal received from the transport path 50 into optical signals for wavelengths and output the optical signals separated for the wavelength to the optical receivers 40 in the unit of a predetermined number of optical signals. In this way, by wavelength-multiplexing and transporting a plurality of subcarriers used in multicarrier transport, it is possible to enhance a transport capacity in one transport path 50. It should be noted that the optical transport system may include the optical transmitters 30A and the optical receivers 40A, instead of the optical transmitters 30 and the optical receivers 40.

It should be noted that the optical transport systems of the above-described embodiments describe a configuration which designates a timing when the allocation of electric path signals to time slots is changed as a timing after a predetermined time elapses (after T frames). However, the timing is not limited thereto and it may be determined by other techniques. For example, when an identifier capable of providing unique identification is allocated to each transport frame, the timing may be designated by the identifier of the transport frame.

Further, in the optical transport systems in the above-described embodiments, when changing the allocation to time slots, a set of a subcarrier transmission unit 34 and a subcarrier reception unit 41 for which the supply of electric power is stopped may be selected by round robin scheduling. By averagely selecting subcarriers for which the supply of electric power is stopped, it is possible to average operating times of the subcarrier transmission unit 34 and the subcarrier reception unit 41 to prolong a usable period of apparatuses. In particular, because a usable period of a laser oscillator used in optical communication is shortened by a conduction time, it is possible to prolong a usable period of the entire system by averaging the conduction time.

Further, as shown in FIGS. 2, 3, and 18, the above-described embodiments describe a case in which a frame having a frame structure in which a forward error correction code (FEC) is included is used, as examples. However, in the above-described embodiments, a frame having a frame structure in which the FEC is not included may be used. In this case, in the framing unit 132, the deframing unit 171, the transport frame generation unit 33, and the transport frame termination unit 42, the processes relating to FEC (addition of a forward error correction code (FEC) and FEC decoding (forward error correction decoding)) is not performed. Further, in this case, the processes relating to the FEC may be performed by the transmitters 220 and the receivers 230, for example.

The optical transmitters and the optical receivers in the above-described embodiments may be realized by a computer. In this case, a program for realizing structural components included in the optical transmitters and the optical receivers may be recorded on a computer-readable recording medium, and the program recorded on the recording medium may be read into a computer system to be executed. It should be noted that the "computer system" referred to here includes an operating system (OS) and hardware such as peripheral devices. Further, the "computer-readable recording medium" refers to a portable medium such as a flexible disc, a magneto-optical disc, a read only memory (ROM), or a compact disc (CD)-ROM, or a storage apparatus such as a hard disk mounted in the computer system. Further, the "computer-readable recording medium" may include a medium that dynamically retains a program for a short time, such as a communication line when the program is transmitted through a network such as the Internet or a communication line such as a telephone line, or a medium that retains the program for a predetermined time, such as a volatile memory in a computer system which serves as a server or a client in such a case. In addition, the program may be a program for realizing some of the above-described structural components, or may be a program for realizing the above-described structural components by a combination with a program which is already recorded in the computer system. Furthermore, the optical transmitters and the optical receivers may be realized using hardware such as a programmable logic device (PLD) or a field programmable gate array (FPGA).

Hereinbefore, the embodiments of the present invention have been described in detail with reference to the drawings, but specific configurations are not limited to the embodiments, and may include design or the like in a range without departing from the concept of the present invention.

INDUSTRIAL APPLICABILITY

The present invention can also be applied to applications that enhance the utilization efficiency of resources in multicarrier transport.

DESCRIPTION OF REFERENCE SYMBOLS 30, 30A: optical transmitter
31: client accommodation unit
32: time-multiplexing processing unit
33: transport frame generation unit
34, 34-1, 34-2, 34-4, 34-$i$: subcarrier transmission unit
35: TS control unit
36: power source control unit
39: control signal transmission unit
40, 40A: optical receiver
41, 41-1, 41-2, 41-3, 41-$i$: subcarrier reception unit
42: transport frame termination unit
43: time-demultiplexing processing unit
44: client reproduction unit
45: TS control unit
46: power source control unit
49: control signal reception unit
50: transport path
61: wavelength multiplexing unit
62: wavelength separation unit
100: framer
110: transmission processing unit
120: client signal reception unit
121: reception unit
122: mapping unit
123: OH processing unit
130: multiplexing processing unit
131: multiplexing unit
132: framing unit
140: line-side transmission processing unit
141: interleaving unit
142, 142-1, 142-2, 142-3, 142-4, 142-$i$: OH processing unit
143, 143-1, 143-2, 143-3, 143-4, 143-$i$: multilane transmission unit
150: reception processing unit
160: line-side reception processing unit
161-1, 161-2, 161-3, 161-4, 161-$i$: multilane reception unit
162-1, 162-2, 162-3, 162-4, 162-$i$: OH processing unit
163: deinterleaving unit
170: separation processing unit
171: deframing unit
172: demultiplexing unit
180: client signal transmission unit
181: OH processing unit
182: demapping unit
183: transmission unit
220: transmitter
230: receiver
321: stuff addition unit
322: writing processing unit
323: buffer memory
431: buffer memory
432: read-out processing unit
433: stuff removing unit

The invention claimed is:

1. An optical transport system comprising:
a time-multiplexing processing unit that time-multiplexes a plurality of client signals and accommodates the client signals in any of a plurality of time slots included in one transport frame;
a time slot control unit that determines, when the time-multiplexing processing unit time-multiplexes the plurality of client signals, which of the plurality of time slots each of the client signals is to be accommodated in;
a transport frame generation unit that divides the transport frame in which the plurality of client signals are accommodated into a plurality of transmission signals;
a plurality of subcarrier transmission units that are provided for the transmission signals and convert the plurality of transmission signals which are electric signals into optical signals using different optical carriers, and transmit the converted optical signals;

a plurality of subcarrier reception units that are provided corresponding to the plurality of subcarrier transmission units and receive the optical signals transmitted from the corresponding subcarrier transmission units, and convert the optical signals into reception signals;

a transport frame termination unit that combines the reception signals converted by the plurality of subcarrier reception units to restore the transport frame;

a time-demultiplexing processing unit that time-demultiplexes the transport frame restored by the transport frame termination unit to be separated into the plurality of client signals; and a power source control unit that controls supply of electric power to the plurality of subcarrier transmission units and the plurality of subcarrier reception units, wherein when a value obtained by calculating (the number of used subcarriers)−((the number of time slots to which the plurality of client signals are allocated)/(the number of time slots per subcarrier)) is equal to or greater than 1, the time slot control unit determines a new allocation that accommodates the plurality of client signals sequentially from a time slot corresponding to any one of a plurality of subcarriers without proving an empty time slot, notifies the time-multiplexing processing unit and the time-demultiplexing processing unit of the new allocation, and causes the power source control unit to stop the supply of electric power to a subcarrier transmission unit and a subcarrier reception unit that transmit and receive an optical signal to which the client signals are not allocated.

2. The optical transport system according to claim 1, wherein the plurality of time slots include an unusable time slot in which the client signals are not accommodated, and
the time slot control unit determines the new allocation so that the plurality of client signals are accommodated in time slots excluding the unusable time slot.

3. The optical transport system according to claim 1, wherein the new allocation is transported to the time-demultiplexing processing unit using an overhead of the transport frame.

4. The optical transport system according to claim 1, further comprising a control signal transport unit that transports the new allocation determined by the time slot control unit to the time-demultiplexing processing unit.

5. The optical transport system according to claim 1, wherein the time slot control unit transports the new allocation to the time-demultiplexing processing unit a plurality of times, and
if the same new allocation is received a predetermined number of times, the time-demultiplexing processing unit time-de-multiplexes the transport frame restored by the transport frame termination unit on the basis of the allocation to be separated into the plurality of client signals.

6. The optical transport system according to claim 1, wherein when determining the new allocation, the time slot control unit accommodates the client signals sequentially from a time slot corresponding to, among a plurality of sets of the subcarrier transmission units and the subcarrier reception units, a set that is transmitting and receiving a control signal common to all the sets.

7. A resource optimization method comprising:
a time-multiplexing processing step of time-multiplexing a plurality of client signals and accommodating the client signals in any of a plurality of time slots included in one transport frame, in a time-multiplexing processing unit;

a time slot control step of determining, when the plurality of client signals are time-multiplexed in the time-multiplexing processing step, which of the plurality of time slots each of the client signals is to be accommodated in;

a transport frame generation step of dividing the transport frame in which the plurality of client signals are accommodated into a plurality of transmission signals;

a subcarrier transmission step of converting the plurality of transmission signals which are electric signals into optical signals using different optical carriers and transmitting the converted optical signals, in a plurality of subcarrier transmission units that are provided for the transmission signals;

a subcarrier reception step of receiving, in a plurality of subcarrier reception units that are provided corresponding to the plurality of subcarrier transmission units, the optical signals transmitted from corresponding subcarrier transmission units and converting the optical signals into reception signals;

a transport frame termination step of combining the reception signals converted in the subcarrier reception step to restore the transport frame;

a time-demultiplexing processing step of time-demultiplexing the transport frame restored in the transport frame termination step to be separated into the plurality of client signals, in a time-demultiplexing processing unit; and a power source control step of controlling supply of electric power to the plurality of subcarrier transmission units and the plurality of subcarrier reception units, wherein the time slot control step comprises:
a step of determining a new allocation that accommodates the plurality of client signals sequentially from a time slot corresponding to any one of a plurality of subcarriers without providing an empty time slot when a value obtained by calculating (the number of used subcarriers)−((the number of time slots to which the plurality of client signals are allocated)/(the number of time slots per subcarrier)) is equal to or greater than 1;

a step of notifying the time-multiplexing processing unit and the time-demultiplexing processing unit of the new allocation; and a step of stopping the supply of electric power to a subcarrier transmission unit and a subcarrier reception unit that transmit and receive an optical signal to which the client signals are not allocated.

8. An optical transport system comprising:
a time-multiplexing processing unit that time-multiplexes a plurality of client signals and accommodates the client signals in any of a plurality of time slots included in one transport frame;

a time slot control unit that determines, when the time-multiplexing processing unit time-multiplexes the plurality of client signals, which of the plurality of time slots each of the client signals is to be accommodated in;

a transport frame generation unit that divides the transport frame in which the plurality of client signals are accommodated into a plurality of transmission signals;

a plurality of subcarrier transmission units that are provided for the transmission signals and convert the plurality of transmission signals which are electric signals into optical signals using different optical carriers, and transmit the converted optical signals;
a plurality of subcarrier reception units that are provided corresponding to the plurality of subcarrier transmission units and receive the optical signals transmitted from the corresponding subcarrier transmission units, and convert the optical signals into reception signals;
a transport frame termination unit that combines the reception signals converted by the plurality of subcarrier reception units to restore the transport frame;
a time-demultiplexing processing unit that time-demultiplexes the transport frame restored by the transport frame termination unit to be separated into the plurality of client signals; and
a power source control unit that controls supply of electric power to the plurality of subcarrier transmission units and the plurality of subcarrier reception units,
wherein the time slot control unit determines whether or not fragmentation of the time slots occurs by using a value obtained by calculating (the number of used subcarriers)−((the number of time slots to which the plurality of client signals are allocated)/(the number of time slots per subcarrier−the number of time slots that accommodate no client signal per subcarrier)) as an index, and
when the time slot control unit determines that the fragmentation of the time slots occurs, the time slot control unit determines a new allocation that accommodates the plurality of client signals sequentially from a time slot corresponding to any one of a plurality of subcarriers without proving an empty time slot, notifies the time-multiplexing processing unit and the time-demultiplexing processing unit of the new allocation, and causes the power source control unit to stop the supply of electric power to a subcarrier transmission unit and a subcarrier reception unit that transmit and receive an optical signal to which the client signals are not allocated.

9. The optical transport system according to claim 8, wherein the plurality of time slots include an unusable time slot in which the client signals are not accommodated, and
the time slot control unit determines the new allocation so that the plurality of client signals are accommodated in time slots excluding the unusable time slot.

10. The optical transport system according to claim 8, wherein the new allocation is transported to the time-demultiplexing processing unit using an overhead of the transport frame.

11. The optical transport system according to claim 8, further comprising a control signal transport unit that transports the new allocation determined by the time slot control unit to the time-demultiplexing processing unit.

12. The optical transport system according to claim 8, wherein the time slot control unit transports the new allocation to the time-demultiplexing processing unit a plurality of times, and
if the same new allocation is received a predetermined number of times, the time-demultiplexing processing unit time-de-multiplexes the transport frame restored by the transport frame termination unit on the basis of the allocation to be separated into the plurality of client signals.

13. The optical transport system according to claim 8, wherein when determining the new allocation, the time slot control unit accommodates the client signals sequentially from a time slot corresponding to, among a plurality of sets of the subcarrier transmission units and the subcarrier reception units, a set that is transmitting and receiving a control signal common to all the sets.

14. A resource optimization method comprising:
a time-multiplexing processing step of time-multiplexing a plurality of client signals and accommodating the client signals in any of a plurality of time slots included in one transport frame, in a time-multiplexing processing unit;
a time slot control step of determining, when the plurality of client signals are time-multiplexed in the time-multiplexing processing step, which of the plurality of time slots each of the client signals is to be accommodated in;
a transport frame generation step of dividing the transport frame in which the plurality of client signals are accommodated into a plurality of transmission signals;
a subcarrier transmission step of converting the plurality of transmission signals which are electric signals into optical signals using different optical carriers and transmitting the converted optical signals, in a plurality of subcarrier transmission units that are provided for the transmission signals;
a subcarrier reception step of receiving, in a plurality of subcarrier reception units that are provided corresponding to the plurality of subcarrier transmission units, the optical signals transmitted from corresponding subcarrier transmission units and converting the optical signals into reception signals;
a transport frame termination step of combining the reception signals converted in the subcarrier reception step to restore the transport frame;
a time-demultiplexing processing step of time-demultiplexing the transport frame restored in the transport frame termination step to be separated into the plurality of client signals, in a time-demultiplexing processing unit; and
a power source control step of controlling supply of electric power to the plurality of subcarrier transmission units and the plurality of subcarrier reception units,
wherein the time slot control step comprises:
a step of determining whether or not fragmentation of the time slots occurs by using a value obtained by calculating (the number of used subcarriers)−((the number of time slots to which the plurality of client signals are allocated)/(the number of time slots per subcarrier−the number of time slots that accommodate no client signal per subcarrier)) as an index;
a step of determining a new allocation that accommodates the plurality of client signals sequentially from a time slot corresponding to any one of a plurality of subcarriers without providing an empty time slot when it is determined that the fragmentation of the time slots occurs;
a step of notifying the time-multiplexing processing unit and the time-demultiplexing processing unit of the new allocation; and
a step of stopping the supply of electric power to a subcarrier transmission unit and a subcarrier reception unit that transmit and receive an optical signal to which the client signals are not allocated.

* * * * *